United States Patent
Yu et al.

(10) Patent No.: US 7,138,656 B2
(45) Date of Patent: Nov. 21, 2006

(54) LIQUID CRYSTAL DISPLAY PANEL AND FABRICATING METHOD THEREOF

(75) Inventors: Sang Hee Yu, Gunpo-si (KR); Won Seok Kang, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/167,140

(22) Filed: Jun. 28, 2005

(65) Prior Publication Data

US 2006/0022202 A1   Feb. 2, 2006

(30) Foreign Application Priority Data

Jun. 29, 2004  (KR) .................. 10-2004-0049314

(51) Int. Cl.
*H01L 29/04* (2006.01)

(52) U.S. Cl. ............... 257/59; 257/72; 257/E29.117; 257/440

(58) Field of Classification Search .......... 257/59, 257/72, E27.1, 440, E27.132, E31.097
See application file for complete search history.

(56) References Cited

U.S. PATENT DOCUMENTS 6,710,370 B1 *   3/2004   Street et al. .................. 257/59

| | | | |
|---|---|---|---|
| 2006/0007213 A1 * | 1/2006 | Hashimoto et al. | 345/204 |
| 2006/0066512 A1 * | 3/2006 | Afentakis et al. | 345/55 |
| 2006/0119590 A1 * | 6/2006 | Park et al. | 345/175 |
| 2006/0139289 A1 * | 6/2006 | Yoshida et al. | 345/98 |

* cited by examiner

*Primary Examiner*—Thao P. Le
(74) *Attorney, Agent, or Firm*—McKenna Long & Aldridge LLP

(57) ABSTRACT

A liquid crystal display panel and a fabricating method thereof for reducing the number of data lines and the capacitance of a parasitic capacitor between pixel electrodes are disclosed. A first switching part has at least two thin film transistors for applying a first pixel signal that is supplied to a first data line to a first pixel electrode under control of the second control line and the gate line. A second switching part has at least two thin film transistors for applying a second pixel signal supplied to the second data line to the second pixel electrode under control of the first control line and the gate line. A turn-on current value of wither of the two thin film transistors, in each of the first and second switching parts, is more than that of the other thin film transistor.

10 Claims, 22 Drawing Sheets

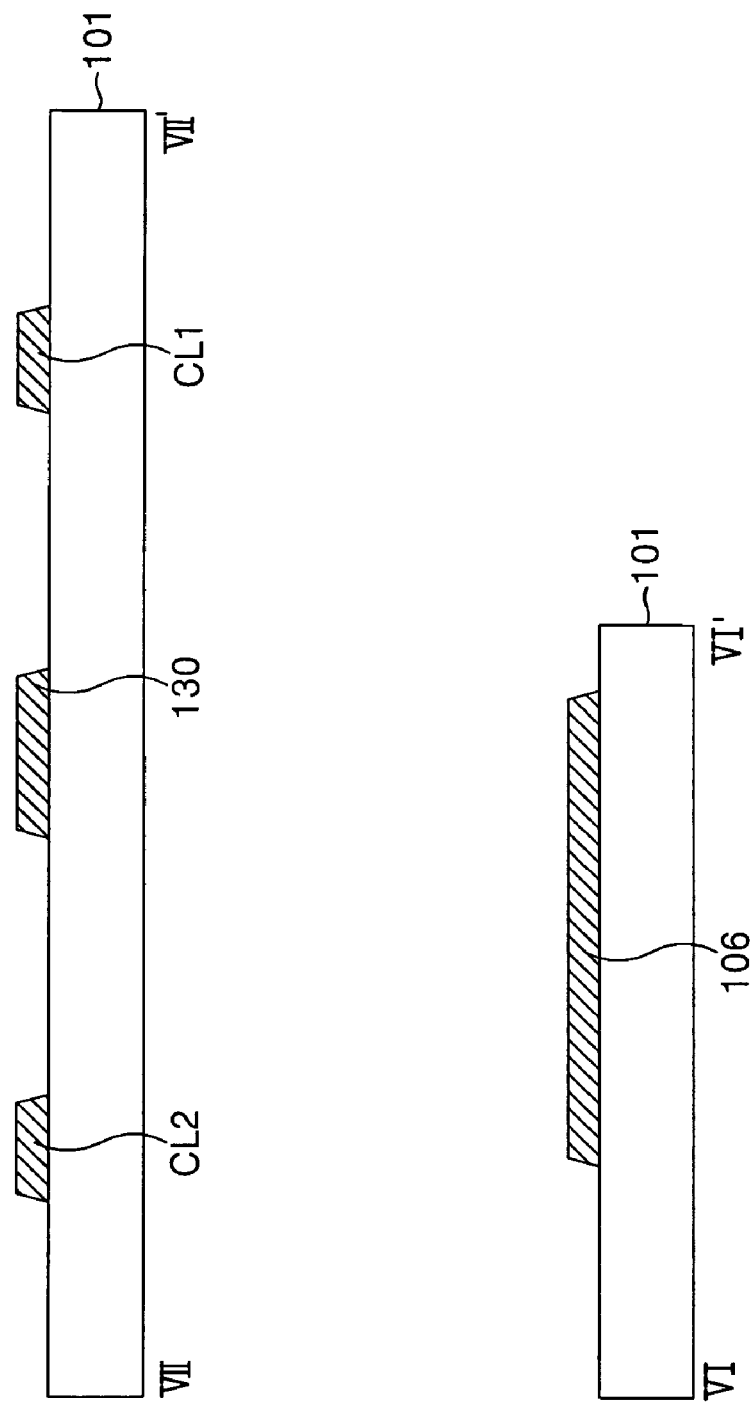

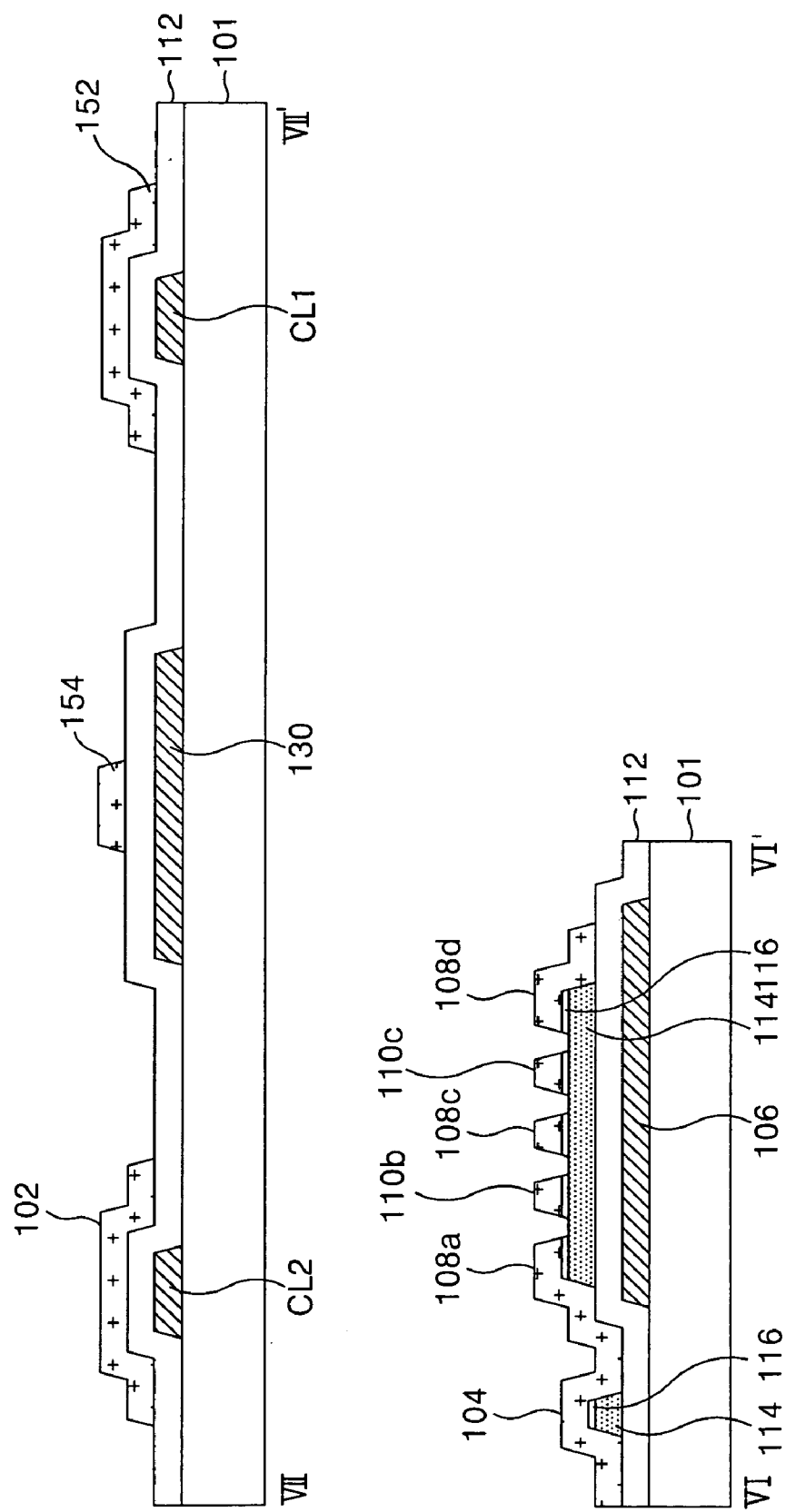

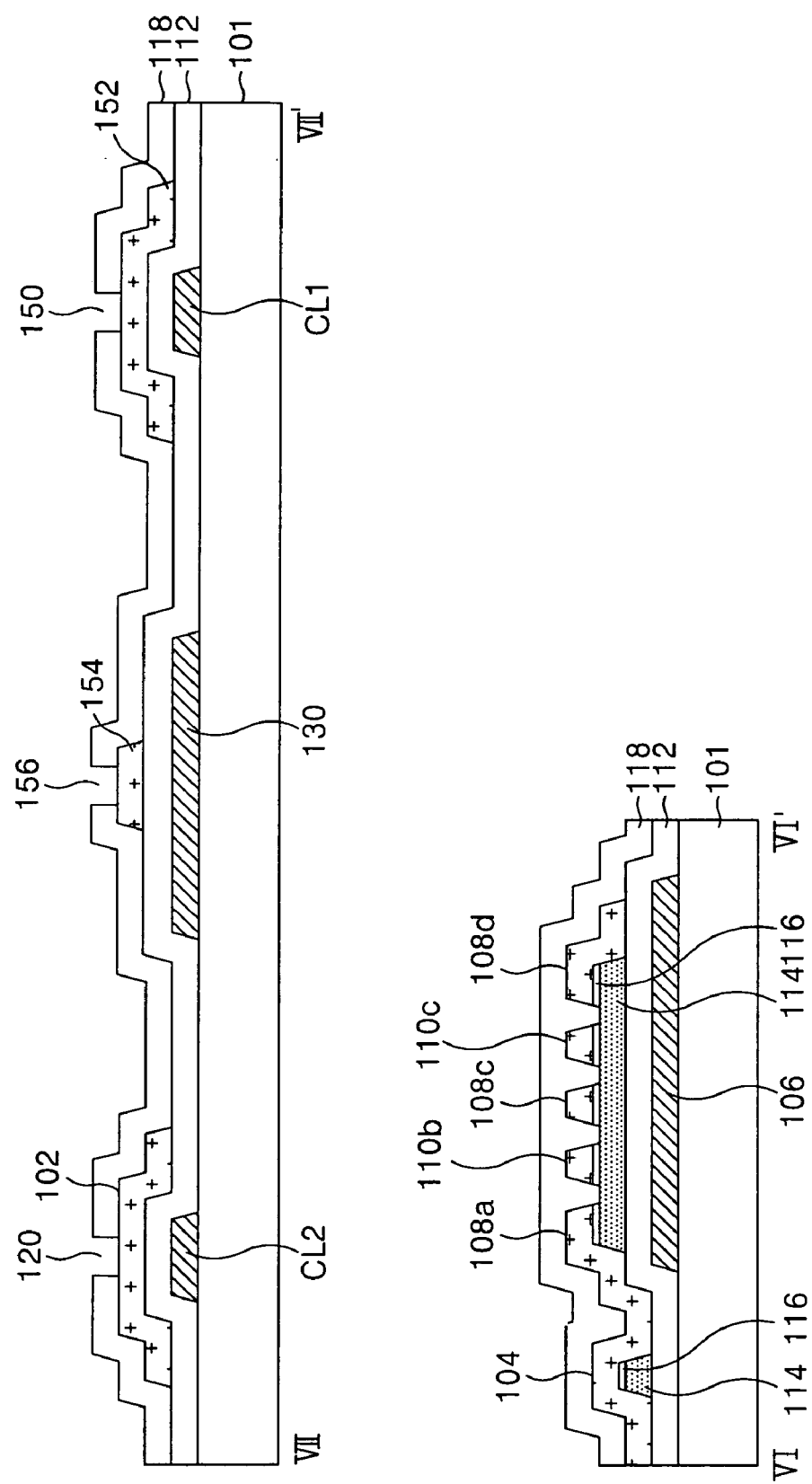

US 7,138,656 B2

LIQUID CRYSTAL DISPLAY PANEL AND FABRICATING METHOD THEREOF

This application claims the benefit of Korean Patent Application No. P2004-49314 filed in Korea on Jun. 29, 2004, which is hereby incorporated by reference for all purposes as if fully set forth herein.

BACKGROUND OF THE INVENTION

1. Field of the Invention

This invention relates to a liquid crystal display panel, and more particularly to a liquid crystal display panel and a fabricating method thereof that are adaptive for reducing the number of data lines as well as a capacitance value of a parasitic capacitor between pixel electrodes.

2. Description of the Related Art

Generally, a liquid crystal display (LCD) controls a light transmittance of a liquid crystal using an electric field to thereby display a picture. To this end, the LCD includes a liquid crystal display panel having a pixel matrix, and a driving circuit for driving the liquid crystal display panel. The driving circuit drives the pixel matrix such that picture information can be displayed on the display panel.

FIG. 1 illustrates a related art liquid crystal display device.

Referring to FIG. 1, the related art LCD includes a liquid crystal display panel 2, a data driver 4 for driving data lines DL1 to DLm of the liquid crystal display panel 2, and a gate driver 6 for driving gate lines GL1 to GLn of the liquid crystal display panel 2.

The liquid crystal display panel 2 is comprised of thin film transistors TFT each of which is provided at each intersection between the gate lines GL1 to GLn and the data lines DL1 to DLm, and liquid crystal cells connected to the thin film transistors TFT and arranged in a matrix type.

The gate driver 6 sequentially applies a gate signal to each gate line GL1 to GLn in response to a control signal from a timing controller (not illustrated). The data driver 4 converts data R, G and B from the timing controller into analog video signals to thereby apply video signals for one horizontal line to the data lines DL1 to DLm every one horizontal period when a gate signal is applied to each gate line GL1 to GLn.

The thin film transistor TFT applies a data from the data lines DL1 to DLm to the liquid crystal cell in response to a control signal from the gate lines GL1 to GLn. The liquid crystal cell can be equivalently expressed as a liquid crystal capacitor Clc because it is comprised of a common electrode opposed to each other with having a liquid crystal therebetween and a pixel electrode connected to the thin film transistor TFT. Such a liquid crystal cell includes a storage capacitor (not illustrated) connected to a pre-stage gate line in order to keep a data voltage charged in the liquid crystal capacitor Clc until the next data voltage is charged therein.

The liquid crystal cells of such a related art LCD forms vertical lines equal to the number (i.e., m) of the data lines DL1 to DLm because they are provided at intersections between the gate lines DL1 to DLn and the data lines DL1 to DLm. In other words, the liquid crystal cells are arranged in a matrix type in such a manner to make m vertical lines and n horizontal lines.

The related art LCD requires m data lines DL1 to DLm so as to drive the liquid crystal cells having m vertical lines. Thus, the related art LCD requires m/i data driver integrated circuits (wherein i is the number of data output lines provided by one data integrated circuit) in order to drive m data lines. Therefore, as a resolution of the LCD goes higher, the number of expensive data driver integrated circuits is not only more increased, but also a process time for attaching the driver integrated circuit and a manufacturing cost of the LCD is more increased. As a result, this raises a problem causing a cost rise factor of the LCD.

SUMMARY OF THE INVENTION

Accordingly, it is an advantage of the present invention to provide a liquid crystal display panel and a fabricating method thereof that are adaptive for reducing the number of data lines as well as a capacitance value of a parasitic capacitor.

In order to achieve these and other advantages of the invention, a liquid crystal display panel according to one aspect of the present invention includes a plurality of gate lines provided on a substrate; a first and a second control lines provided in a direction parallel to the gate lines; a first and a second data lines crossing the gate lines to define a first and a second pixel areas; a first and a second pixel electrodes provided at the respective first and second pixel area; a first switching part having at least two thin film transistors for applying a first pixel signal supplied to the first data line to the first pixel electrode under control of the second control line and the gate line; and a second switching part having at least two thin film transistors for applying a second pixel signal supplied to the second data line to the second pixel electrode under control of the first control line and the gate line, wherein a turn-on current value of any one of said at least two thin film transistors, in each of the first and second switching parts, is more than that of the other thin film transistor.

In the liquid crystal display panel, the first switching part includes a first thin film transistor, being turned on when a control signal is applied to the second control line, for receiving said first pixel signal; and a second thin film transistor, being connected to the gate line to be turned on when said gate signal is supplied, for applying said first pixel signal to the first pixel electrode, wherein the first thin film transistor has a larger channel width than the second thin film transistor.

Herein, the first thin film transistor includes a gate electrode connected to the second control line, a source electrode connected to the first data line and having at least three protrusions, a drain electrode having at least two protrusions connected to the source electrode of the second thin film transistor, and a first width of channel provided between the source and drain electrodes; and the second thin film transistor includes a gate electrode connected to the gate line, a source electrode connected to the drain electrode of the first thin film transistor and having at least two protrusions, a drain electrode connected to the first pixel electrode and having at least one protrusion, and a semiconductor pattern having a second width of channel less than said first width provided between the source and drain electrodes.

In the liquid crystal display panel, the second switching part includes a third thin film transistor, being turned on when a control signal is applied to the first control line, for receiving said second pixel signal; and a fourth thin film transistor, being connected to the gate line to be turned on when said gate signal is supplied, for applying said second pixel signal to the second pixel electrode, wherein the third thin film transistor has a larger channel width than the fourth thin film transistor.

The third thin film transistor includes a gate electrode connected to the first control line, a source electrode connected to the second data line and having at least three protrusions, a drain electrode having at least two protrusions connected to the source electrode of the fourth thin film transistor, and a first width of channel provided between the source and drain electrodes; and the fourth thin film transistor includes a gate electrode connected to the gate line, a source electrode connected to the drain electrode of the third thin film transistor and having at least two protrusions, a drain electrode connected to the second pixel electrode and having at least one protrusion, and a semiconductor pattern having a second width of channel less than said first width provided between the source and drain electrodes.

In the liquid crystal display panel, any semiconductor pattern of the first and third thin film transistors includes an active layer, and an ohmic contact layer having a "W"-shaped hole along the source drain electrodes on the active layer, and any semiconductor pattern of the second and fourth thin film transistors includes an active layer, and an ohmic contact layer having a hole taking any one of "U" and "W" shapes.

The liquid crystal display panel further includes a first common electrode making a horizontal electric field along with the first pixel electrode; a second common electrode making a horizontal electric field along with the second pixel electrode; and a common line provided in parallel to the gate line to apply a reference voltage to the first and second common electrodes.

The liquid crystal display panel further includes a first storage capacitor consisting of the first control line, and any one of the first and second pixel electrodes overlapping with the first control line with having at least one layer of insulating film therebetween; a second storage capacitor consisting of the second control line, and any one of the first and second pixel electrodes overlapping with the second control line with having at least one layer of insulating film therebetween; and a third storage capacitor consisting of the common line, and any one of the first and second pixel electrodes overlapping with the common line with having at least one layer of insulating film therebetween.

Alternatively, the liquid crystal display panel further includes a first storage capacitor consisting of the first control line, and a first storage electrode connected to any one of the first and second pixel electrodes overlapping with the first control line with having at least one layer of insulating film therebetween; a second storage capacitor consisting of the second control line, and the drain electrode of the second thin film transistor connected to any one of the first and second pixel electrodes overlapping with the second control line with having at least one layer of insulating film therebetween, said second storage capacitor having the same capacitance value as the first storage capacitor; and a third storage capacitor consisting of the common line, and a second storage electrode connected to any one of the first and second pixel electrodes overlapping with the common line with having at least one layer of insulating film therebetween.

In a method of fabricating a liquid crystal display panel, having a plurality of gate lines provided on a substrate, a first and a second control lines provided in a direction parallel to the gate lines, a first and a second data lines crossing the gate lines to define a first and a second pixel areas, a first and a second pixel electrodes provided at the respective first and second pixel area, a first switching part having at least two thin film transistors for applying a first pixel signal supplied to the first data line to the first pixel electrode under control of the second control line and the gate line, and a second switching part having at least two thin film transistors for applying a second pixel signal supplied to the second data line to the second pixel electrode under control of the first control line and the gate line, according other aspect of the present invention, any one of said at least two transistors has a larger channel width than the other transistor.

BRIEF DESCRIPTION OF THE DRAWINGS

These and other objects of the invention will be apparent from the following detailed description of the embodiments of the present invention with reference to the accompanying drawings.

In the drawings:

FIG. 8A and FIG. 8B are a plan view and a section view, respectively, representing a fabricating method for providing the first conductive pattern group illustrated in FIG. 5 to FIG. 7, respectively;

FIG. 10A and FIG. 10B are a plan view and a section view, respectively, representing a fabricating method for providing the second conductive pattern group illustrated in FIG. 5 to FIG. 7, respectively;

FIG. 11A and FIG. 11B are a plan view and a section view, respectively, representing a fabricating method for providing the protective film illustrated in FIG. 5 to FIG. 7, respectively;

DETAILED DESCRIPTION OF THE ILLUSTRATED EMBODIMENTS

Reference will now be made in detail to embodiments of the present invention, examples of which are illustrated in the accompanying drawings.

Hereinafter, the embodiments of the present invention will be described in detail with reference to FIGS. 2 to 15.

Figure 2:
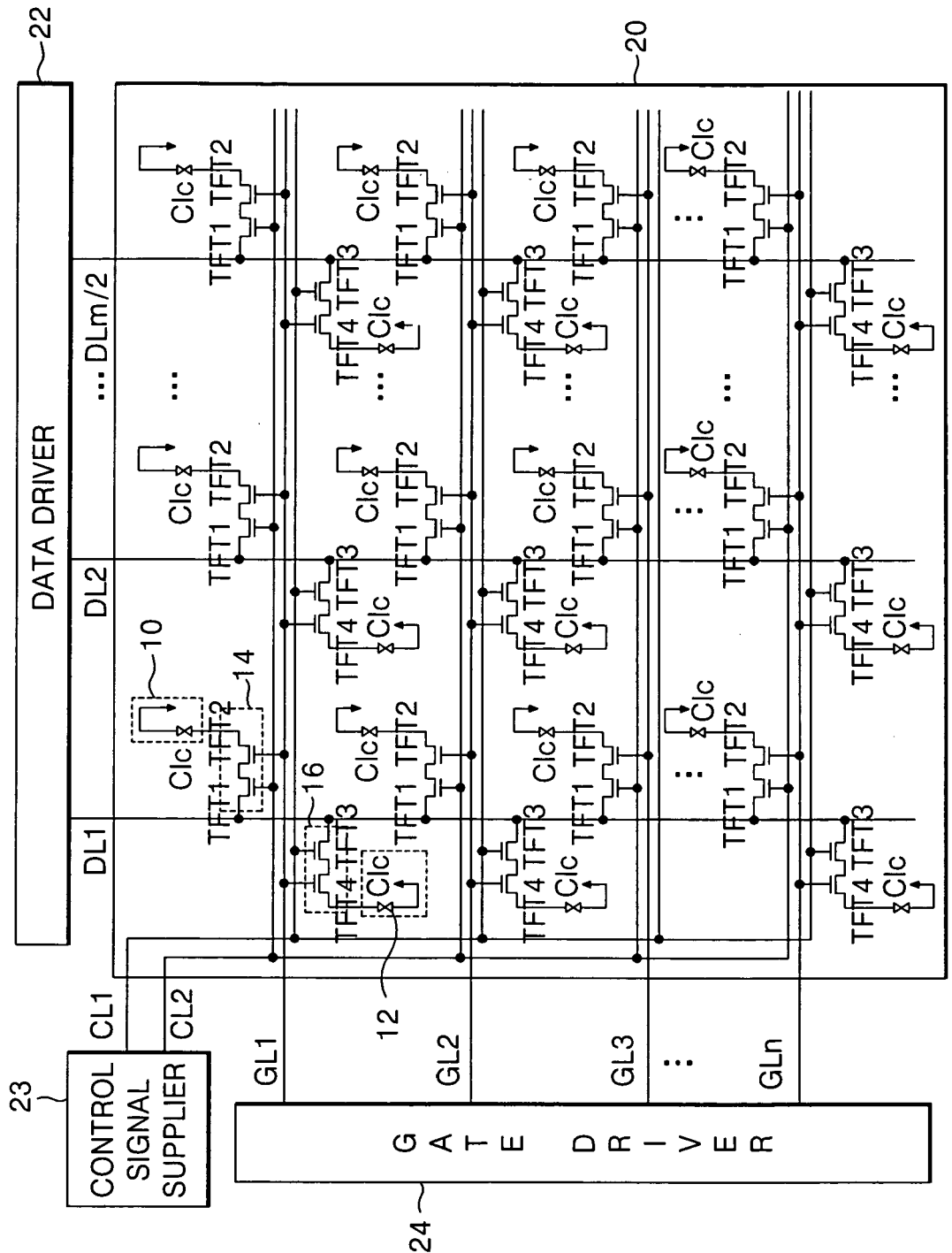
FIG. 2 is a block circuit diagram illustrating a configuration of a liquid crystal display according to an embodiment of the present invention.

FIG. 2 schematically illustrates a liquid crystal display (LCD) according to an exemplary embodiment of the present invention.

Referring to FIG. 2, the LCD according to this embodiment of the present invention includes a liquid crystal display panel 20, a data driver 22 for driving data lines DL1 to DLm/2 of the liquid crystal display panel 20, a gate driver 24 for driving gate lines GL1 to GLn of the liquid crystal display panel 20, and a control signal supplier 23 for supplying control signals to first and second control lines CL1 and CL2 provided in parallel to the gate lines GL1 to GLn.

The liquid crystal display panel 20 includes a first switching part 14 for driving a first liquid crystal cell 10 of first and second liquid crystal cells 10 and 12 alternately provided at each intersection between the gate lines GL1 to GLn and the data lines DL1 to DLm/2, and a second switching part 16 for driving the second liquid crystal cell 12.

Each of the first and second liquid crystal cells 10 and 12 can be equivalently expressed as a liquid crystal capacitor Clc because each of them consists of a pixel electrode connected to each of the first and second switching parts 14 and 16, and a common electrode provided in parallel to the pixel electrode with having a liquid crystal therebetween. Herein, each of the liquid crystal cells 10 and 12 includes a storage capacitor (not illustrated) connected to a pre-stage gate line (or common electrode) or control signal lines CL1 and CL2 in order to keep a video signal voltage charged in the liquid crystal capacitor Clc until the next video signal voltage is charged therein.

Figure 1:
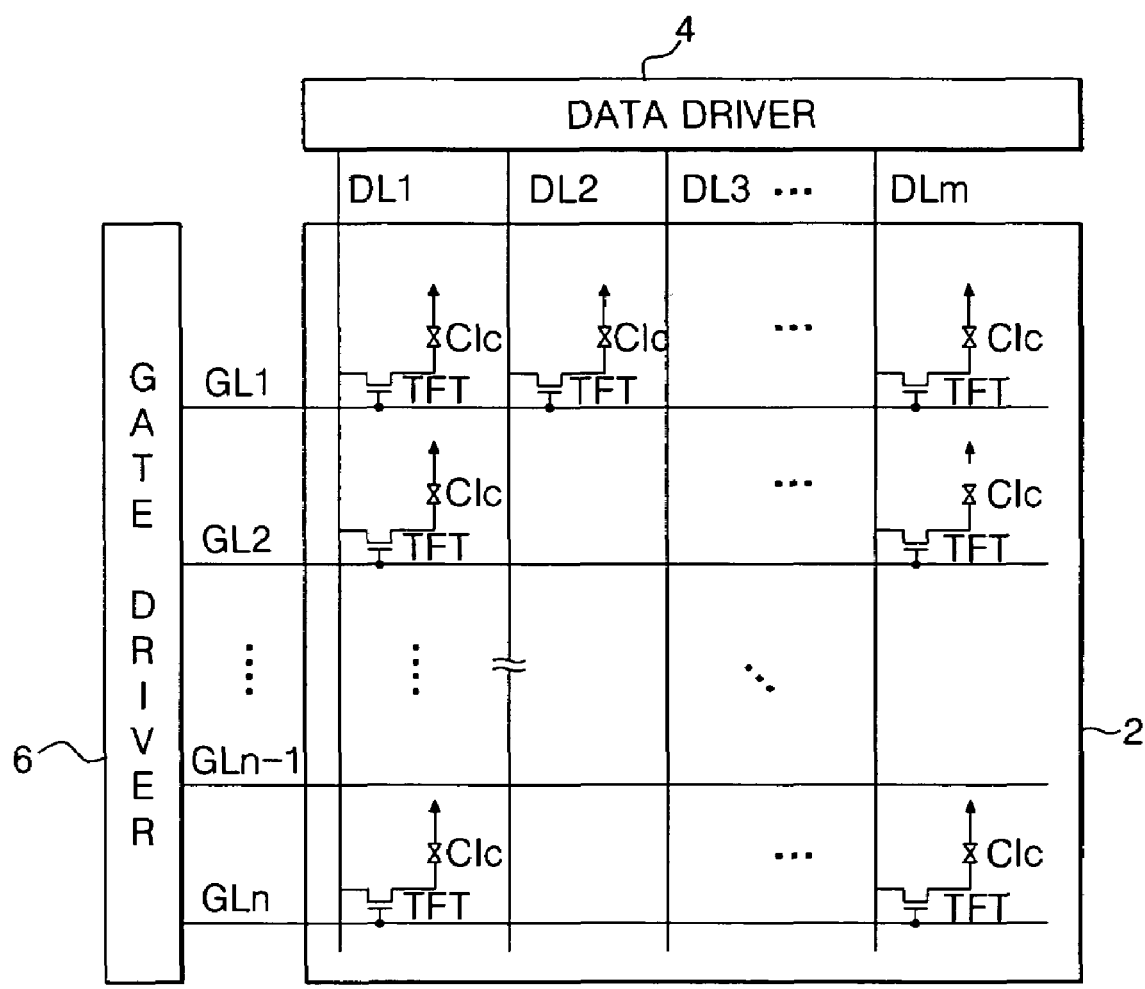
FIG. 1 is a schematic block circuit diagram illustrating a configuration of a related art liquid crystal display.

The first liquid crystal cell 10 and the first switching part 14 are provided at the right side of the data lines DL, that is, even-numbered vertical lines. The second liquid crystal cell 12 and the second switching part 16 are provided at the left side of the data lines DL, that is, odd-numbered vertical lines. In other words, the first liquid crystal cell 10 and the second liquid crystal cell 12 are provided at the left and right side, respectively, with having a single of data line DL therebetween. Herein, the first liquid crystal cell 10 and the second liquid crystal cell 12 receive video signals from the adjacent data lines DL. As a result, the number of data lines DL in the LCD according to this embodiment of the present invention can be reduced to half the number in the related art LCD illustrated in FIG. 1.

The first and second control lines CL1 and CL2 are provided in parallel to the gate line GL (e.g., at the upper and lower sides of the gate line GL) to be connected to any one of the first and second switching parts 14 and 16. Herein, the first control line CL1 is connected to the second switching part 16 while the second control line CL2 is connected to the first switching part 14.

The first switching part 14 for driving the first liquid crystal cell 10 includes first and second thin film transistors TFT1 and TFT2. The first thin film transistor TFT1 is connected to the data line DL and the second control line CL2 to be turned on when a second control signal is applied to the second control line CL2. The second thin film transistor TFT2 is connected between the first thin film transistor TFT1 and the first liquid crystal cell 10 to be turned on when a gate signal is applied, via the gate line GL, to the gate electrode of the second thin film transistor TFT2.

The second switching part 16 for driving the second liquid crystal cell 12 includes third and fourth thin film transistors TFT3 and TFT4. The third thin film transistor TFT3 is connected to the data line DL and the first control line CL1 to be turned on when a first control signal is applied to the first control line CL1. The fourth thin film transistor TFT4 is connected between the third thin film transistor TFT3 and the second liquid crystal cell 12 to be turned on when a gate signal is applied, via the gate line GL, to the gate electrode of the fourth thin film transistor TFT4.

Figure 3:
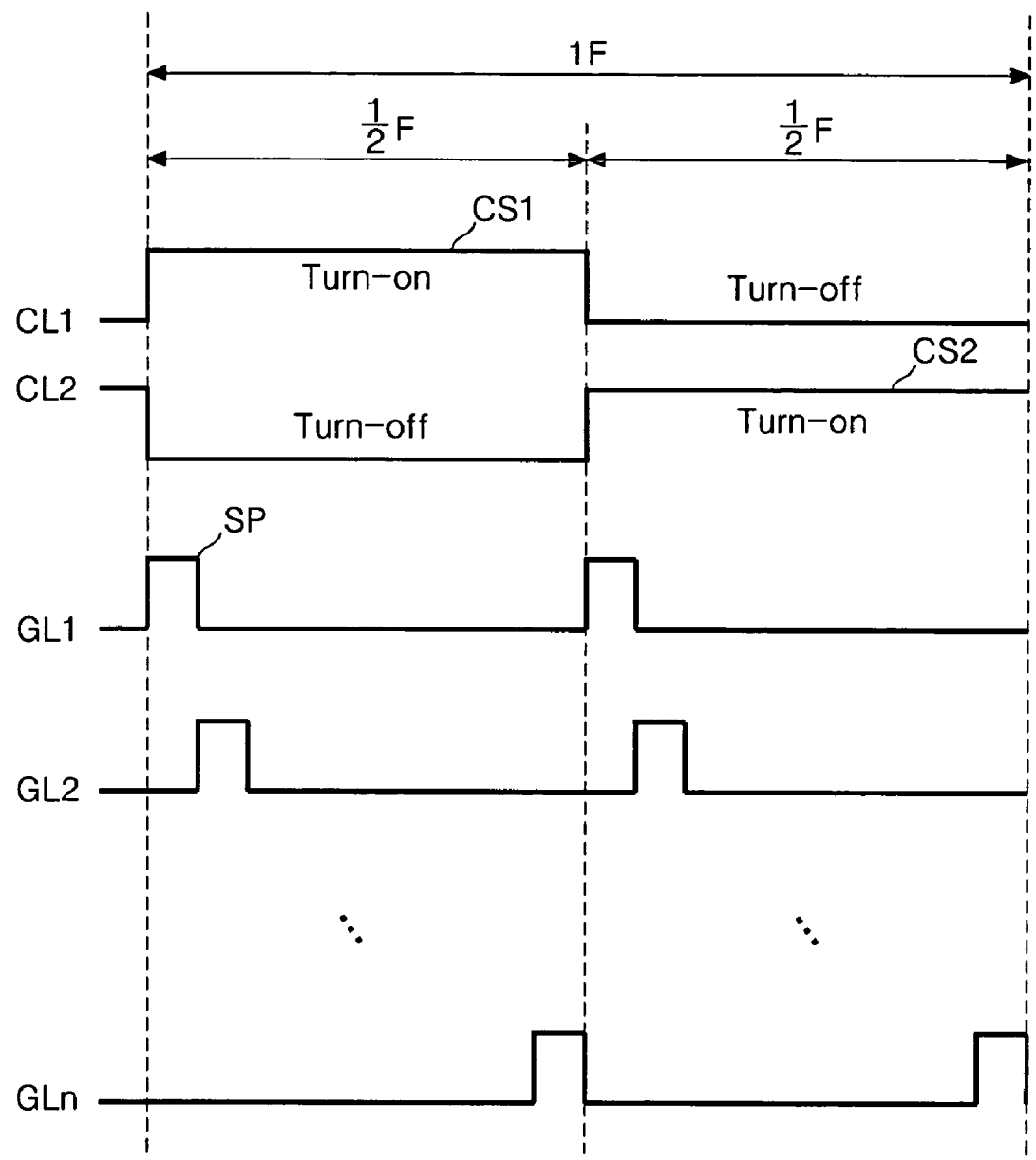
FIG. 3 is a waveform diagram of control signals applied to the control lines illustrated in FIG. 2 and gate signals applied to the gate lines illustrated in FIG. 2.

The gate driver 24 sequentially applies a gate signal SP to the gate lines GL1 to GLn for each ½ frame unit as illustrated in FIG. 3 in response to the control signal supplied from a timing controller (not illustrated). In other words, the gate driver 24 in the embodiment of the present invention drives the gate lines GL1 to GLn for each ½ frame unit.

The data driver 22 converts data R, G and B from the timing controller into analog video signals to thereby apply them to the data lines DL1 to DLm/2. Herein, the data driver 22 alternately applies a pixel signal to be supplied to the first liquid crystal cell 10 and a pixel signal to be supplied to the second liquid crystal cell 12 for each ½ frame unit. In addition, the number of data lines DL1 to DLm/2 in the data driver 22 according to this embodiment of the present invention is reduced to a half of that in the data driver 22 of the related art LCD, so that the number of data driver integrated circuits (IC's) included in the data driver 22 also can be reduced to a half.

The control signal supplier 23 alternately supplies first and second control signals CS1 and CS2 to the first and second control lines CL1 and CL2 for each ½ frame unit as illustrated in FIG. 3. For instance, the control signal supplier 23 can supply the first control signal CS1 to the first control line CL1 during the first-half ½ frame interval while supplying the second control signal CS2 to the second control line CL2 during the second-half ½ frame interval.

Further, the control signal supplier 23 can supply the second control signal CS2 to the second control line CL2 during the first-half ½ frame interval while supplying the first control signal CS1 to the first control line CL1 during the second-half ½ frame interval. Alternatively, the LCD according to this embodiment of the present invention may supply the first and second control signals CS1 and CS2 from the timing controller without the control signal supplier 23 separately as illustrated in FIG. 2.

Hereinafter, a procedure of applying video signals to the liquid crystal cells 10 and 12 will be described in detail.

Firstly, the first control signal CS1 is applied to the first control line CL1 during the first-half ½ frame interval. Then, the third thin film transistors TFT3 connected to the first control line CL1 are turned on. At this time, the first thin film transistors TFT1 keep a turn-off state.

Figure 4A:
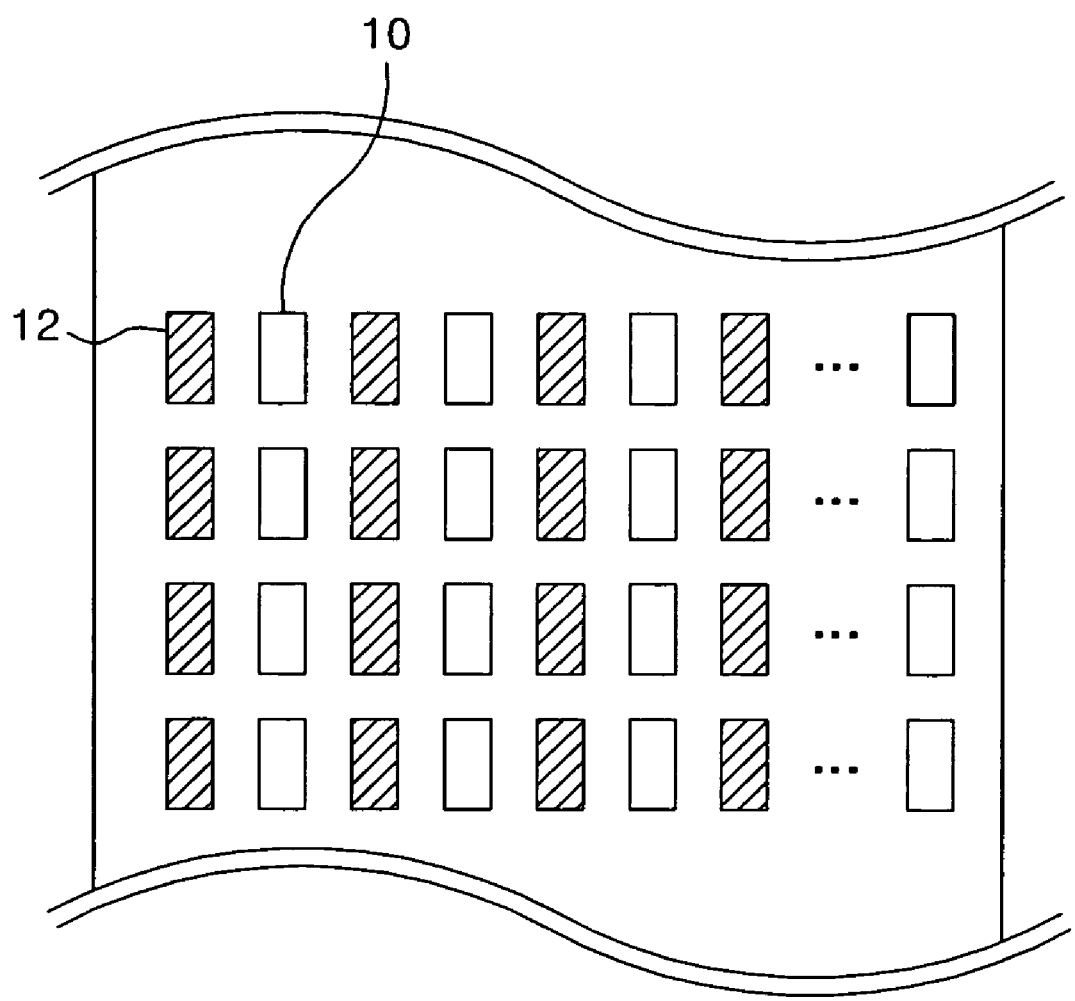
FIG. 4A and FIG. 4B depict liquid crystal cells driven in response to the control signals illustrated in FIG. 3.

The gate signal SP is sequentially applied to the gate lines GL1 to GLn during the first-half ½ frame interval. At this time, the fourth thin film transistor TFT4 connected to the gate line GL is turned on for each horizontal line. Further, video signals to be supplied to the second liquid crystal cell 12 are applied to the data lines DL1 to DLm/2. Then, the video signals supplied to the data lines DL1 to DLm/2 are applied, via the third and fourth thin film transistors TFT3 and TFT4, to the second liquid crystal cell 12. Thus, during the first-half ½ frame interval, the second liquid crystal cells 12 positioned at the odd-numbered vertical lines are driven as illustrated in FIG. 4A. On the other hand, because the second thin film transistor TFT2 is sequentially turned on by the gate signals SP while the first thin film transistor TFT1 is turned off, the video signals are not applied to the first liquid crystal cell 10.

Thereafter, the second control signal CS2 is applied to the second control line CL2 during the second-half ½ frame interval. Then, the first thin film transistors TFT1 connected to the second control line CL2 are turned on. At this time, the third thin film transistors TFT3 are turned off.

Figure 4B:
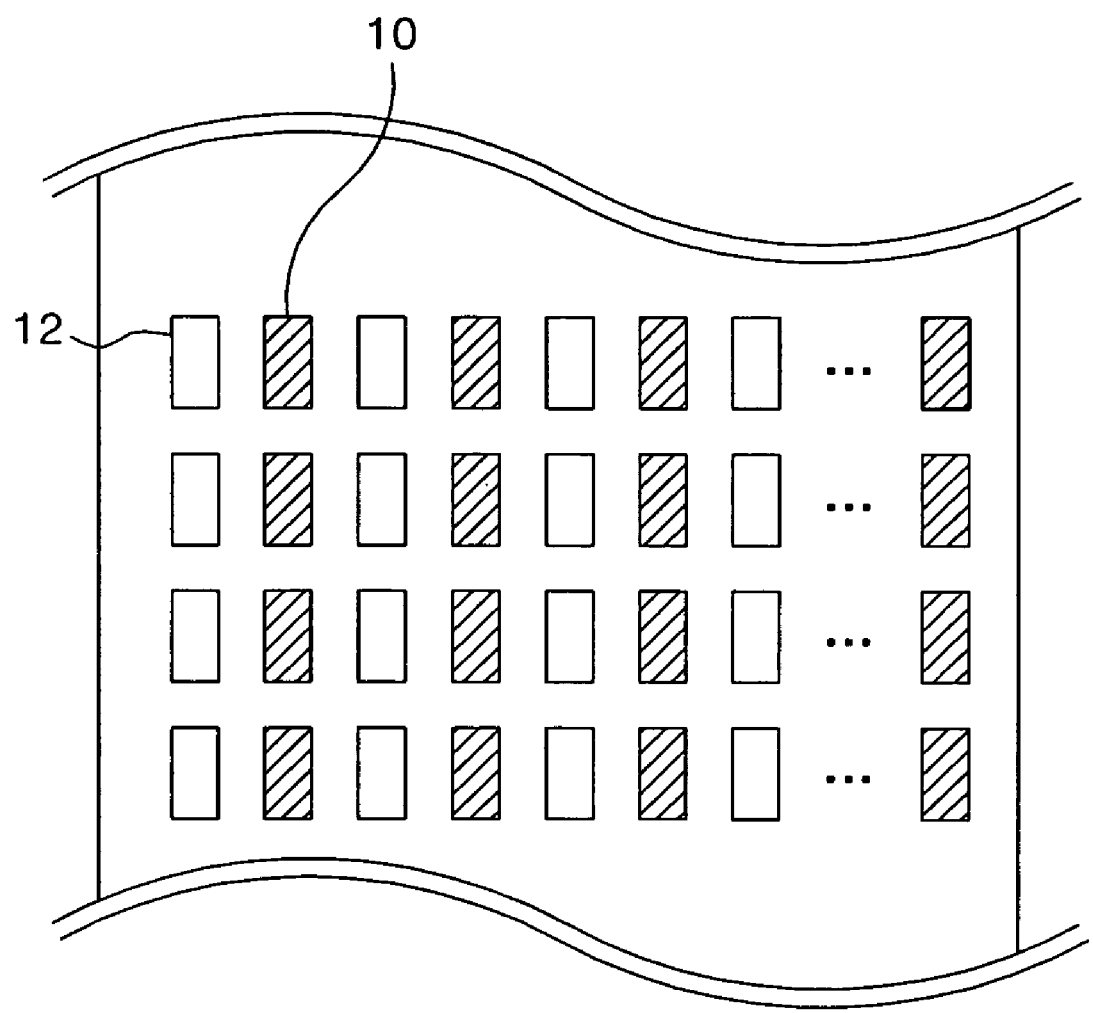

The gate signal SP is sequentially applied to the gate lines GL1 to GLn during the second-half ½ frame interval. At this time, the second thin film transistor TFT2 connected to the gate line GL is turned on for each horizontal line. Further, video signals to be supplied to the first liquid crystal cell 10 are applied to the data lines DL1 to DLm/2. Then, the video signals supplied to the data lines DL1 to DLm/2 are applied, via the first and second thin film transistors TFT1 and TFT2, to the first liquid crystal cell 10. Thus, during the second-half ½ frame interval, the first liquid crystal cells 10 positioned at the even-numbered vertical lines are driven as illustrated in FIG. 4B. On the other hand, because the fourth thin film transistor TFT4 is sequentially turned on by the gate signals SP while the third thin film transistor TFT3 is turned off, the video signals are not applied to the second liquid crystal cell 12.

In other words, according to this embodiment of the present invention, the control signals CS1 and CS2 alternated for each ½ frame are applied to the first and second control lines CL1 and CL2 to thereby turn on the first thin film transistors TFT1 or the second thin film transistors TFT2, so that the first and second liquid crystal cells 10 and 12 can be alternately driven for each ½ frame.

Furthermore, according to this embodiment of the present invention, desired video signals are applied to the first and second liquid crystal cells 10 and 12 positioned a the left and right sides with the aid of a single of data line DL, so that the number of data lines DL and the number of data IC's can be reduced to a half of the prior art and hence the manufacturing cost can be reduced.

Moreover, according to this embodiment of the present invention, the second control signal CS2 is applied during the first-half ½ frame while the first control signal CS1 is applied during the second-half ½ frame. Then, the first liquid crystal cells 10 positioned at the even-numbered vertical lines as illustrated in FIG. 4B are driven during the first-half ½ frame interval, whereas the second liquid crystal cells 12 positioned at the odd-numbered vertical lines as illustrated in FIG. 4A are driven during the second-half ½ frame interval. In other words, an application sequence of the first and second control signals CS1 and CS2 can be controlled and hence a driving sequence of the first and second liquid crystal cells 10 and 12 can be controlled.

Figure 5:
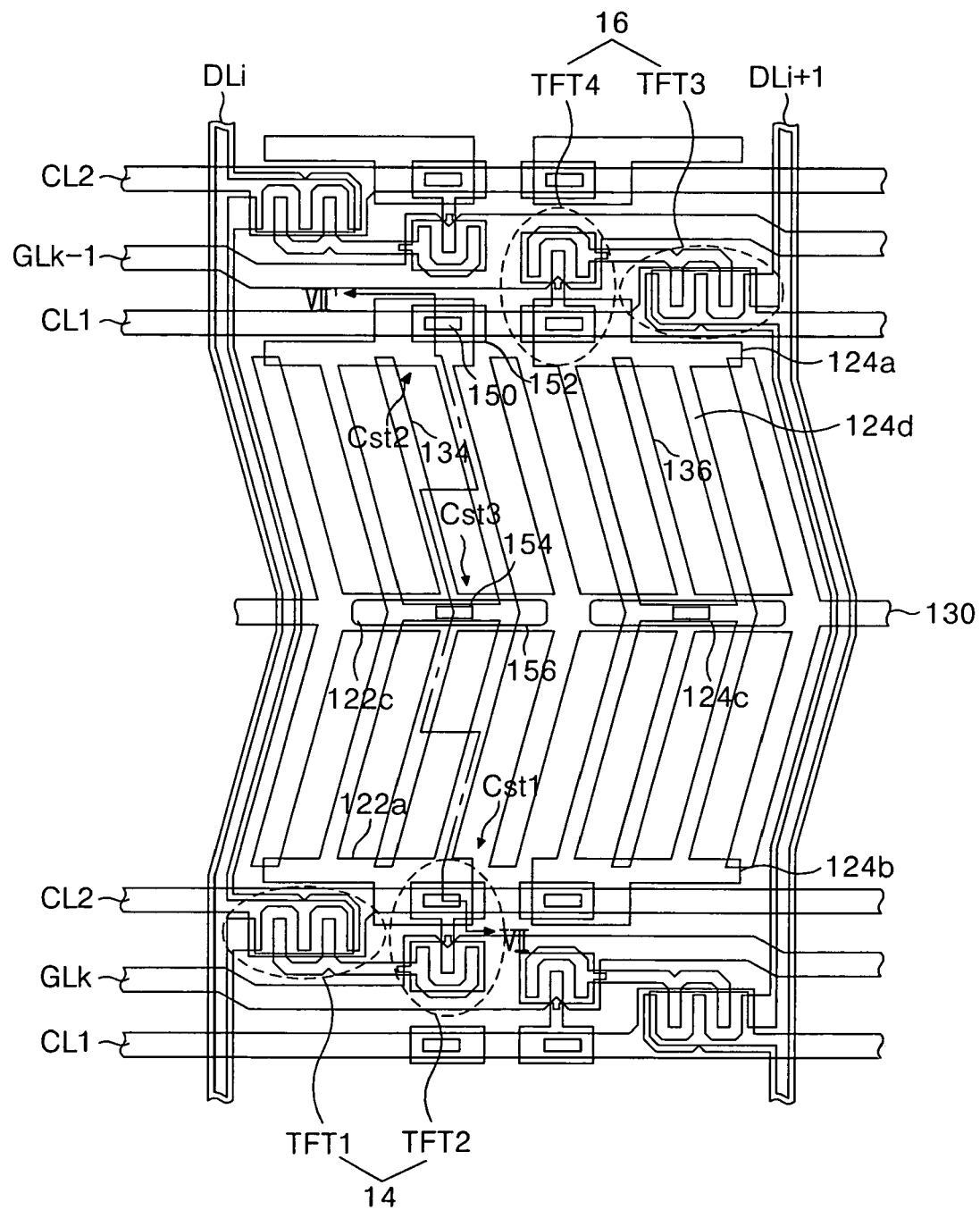
FIG. 5 is a detailed plan view illustrating a structure of a thin film transistor array substrate of the liquid crystal display panel illustrated in FIG. 2.

FIG. 5 is a plan view for illustrating the thin film transistor array substrate of the liquid crystal display panel illustrated in FIG. 2.

Referring to FIG. 5, the thin film transistor array substrate includes a gate line GL provided on a lower substrate 110, first and second control lines CL1 and CL2 positioned at each side thereof with having the gate line GL therebetween, a data line DL provided in such a manner to intersect the first and second control lines CL1 and CL2, first and second thin film transistors TFT1 and TFT2 provided at each intersection between the kth gate line GLk and the ith data line DLi, third and fourth thin film transistors TFT3 and TFT4 provided at each intersection between the (k−1)th gate line GLk−1 and the (i+1)th data line DLi+1, a first pixel electrode 122 provided at a first pixel area 105 defined by an intersection of the second control line CL2 and the ith data line DLi, a second pixel electrode 124 provided at a second pixel area 107 defined by an intersection between the first control line CL1 and the (i+1)th data line DLi+1, a first common electrode 134 provided at the first pixel area 105 in such a manner to make a horizontal electric field along with the first pixel electrode 122, and a second common electrode 136 provided at the second pixel area 107 in such a manner to make a horizontal electric field along with the second pixel electrode 124.

Further, the thin film transistor array substrate includes a storage capacitor Cst provided at an overlapping portion between the pixel electrodes 122 and 124 and the control line CL and provided at an overlapping portion between the common line and the pixel electrode.

Figure 6A:
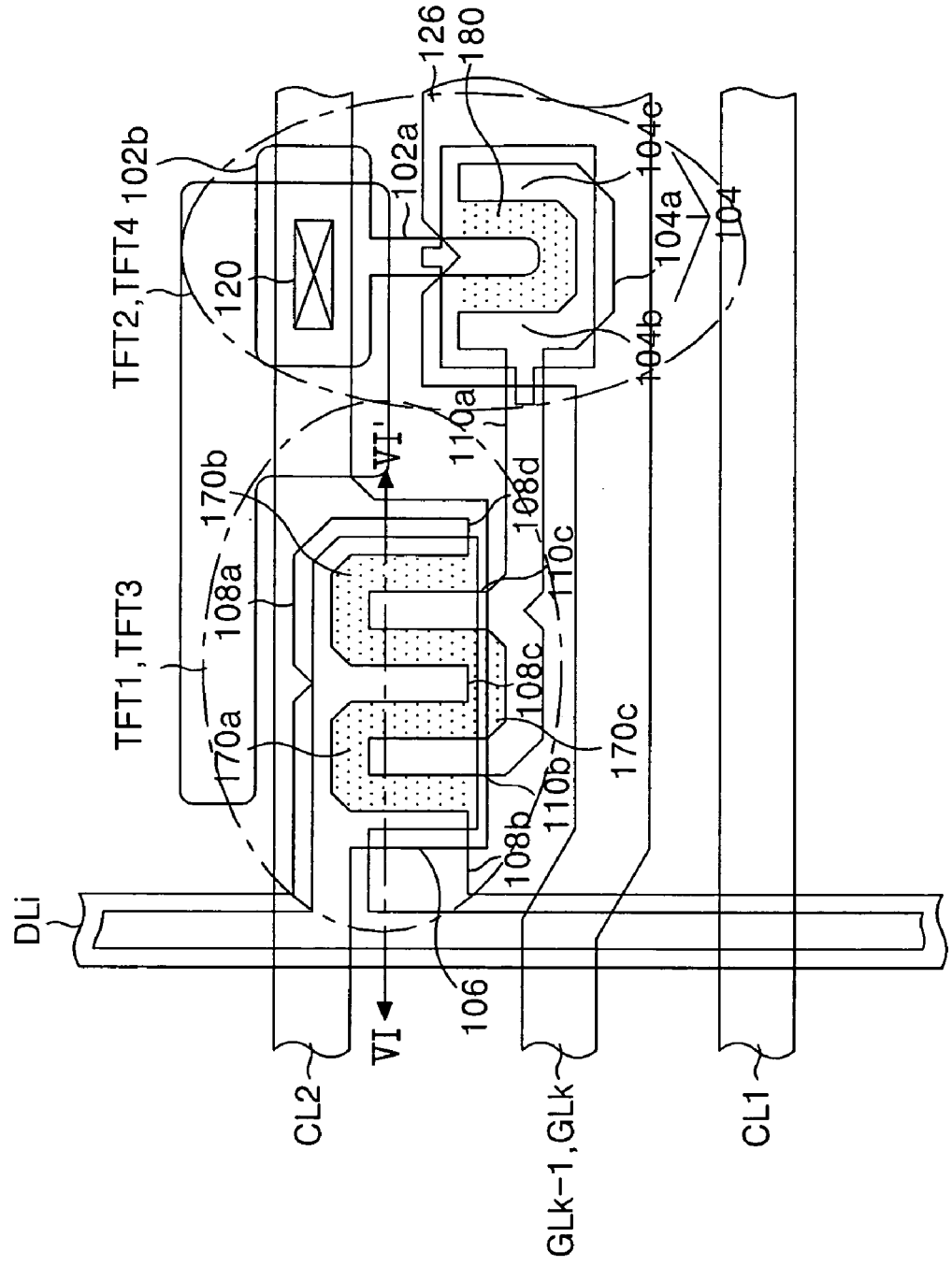
FIG. 6A and FIG. 6B are a detailed plan view and a detailed section view, respectively, of the thin film transistor illustrated in FIG. 5, respectively.
Figure 6B:
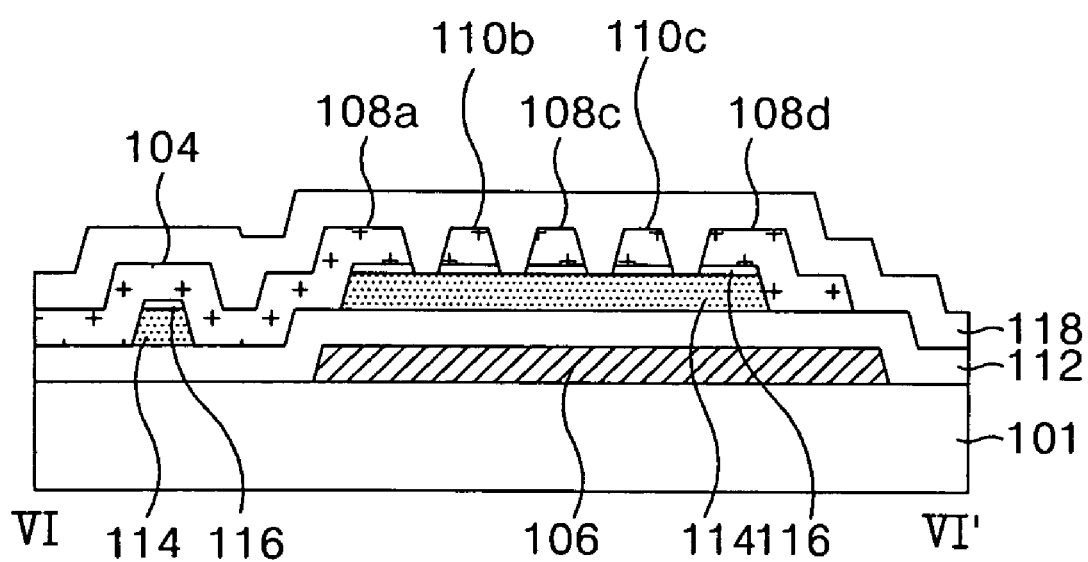

The gate line GL applies a gate signal to the gate electrodes of the second and fourth thin film transistors TFT2 and TFT4. More specifically, as illustrated in FIG. 6A and FIG. 6B, the kth gate line GLk applies a gate signal to the gate electrode 126 of the second thin film transistor TFT1 while the (k−1)th gate line GLk−1 applies a gate signal to the gate electrode of the fourth thin film transistor TFT4.

The data line DL applies a pixel signal, via a source electrode 208 of the first and third thin film transistor TFT1 and TFT3 and the second and fourth thin film transistors TFT2 and TFT4, to the pixel electrodes 122 and 124. More specifically, the ith data line DLi applies a pixel signal, via the source electrode 108 of the first thin film transistor TFT1 and the second thin film transistor TFT2, to the first pixel electrode 122 while the (i+1)th data line DLi+1 applies a pixel signal, via the source electrode of the third thin film transistor TFT3 and the fourth thin film transistor TFT4, to the second pixel electrode 124.

The control lines CL1 and CL2 apply control signals to the first and third thin film transistors TFT1 and TFT3. The first control line CL1 applies a first control signal to the gate electrode of the third thin film transistor TFT3 while the second control line CL2 applies a second control signal to the gate electrode 106 of the first thin film transistor TFT1.

The first thin film transistor TFT1 applies a pixel signal on the ith dada line DLi to the source electrode 104 of the second thin film transistor TFT2 in response to a second control signal on the second control line CL2. To this end, the first thin film transistor TFT1 has a gate electrode 106 connected to the second control line CL2, a source electrode 108 connected to the ith data line DLi, and a drain electrode 110 connected to the source electrode 104 of the second thin film transistor TFT2.

The second thin film transistor TFT2 applies a pixel signal supplied to the source electrode 108 of the first thin film transistor TFT1 to the first pixel electrode 122 in response to a gate signal from the kth gate line GLk. As illustrated in FIG. 6A and FIG. 6B, the second thin film transistor TFT2 has a gate electrode 126 connected to the kth gate line GLk, a source electrode 104 connected to the drain electrode 110 of the first thin film transistor TFT1, and a drain electrode 102 connected to the first pixel electrode 122.

The third thin film transistor TFT3 applies a pixel signal on the (i+1)th data line DLi+1 to the source electrode of the fourth thin film transistor TFT4 in response to a second control signal from the first control line CL1. To this end, the third thin film transistor TFT3 has a gate electrode connected to the first control line CL1, a source electrode connected to the (i+1)the data line DLi+1, and a drain electrode connected to the source electrode of the fourth thin film transistor TFT4.

The fourth thin film transistor TFT4 applies a pixel signal supplied to the source electrode of the third thin film transistor TFT3 in response to a gate signal from the (k−1)th gate line GLk−1. To this end, the, fourth thin film transistor TFT4 has a gate electrode connected to the (k−1)th gate line GLk−1, a source electrode connected to the drain electrode of the third thin film transistor TFT3, and a drain electrode connected to the second pixel electrode 124.

Further, the first to fourth thin film transistors TFT1 to TFT4 are provided with an active layer 114 overlapping with the gate electrode with having a gate insulating film 112 therebetween to define a channel between the source electrodes 108 and 104 and the drain electrodes 110 and 106, and an ohmic contact layer 116 for making an ohmic contact with the source electrodes 108 and 104 and the drain electrodes 110 and 106.

In addition, the first and third thin film transistors TFT1 and TFT3 connected to the first and second control lines CL1 and CL2 must have a larger on-current than the second and fourth thin film transistors TFT2 and TFT4.

More specifically, the LCD according to this embodiment of the present invention divides one frame interval into the first-half ½ frame interval and the second-half ½ frame interval for its driving in order to reduce the number of data lines and the number of data driving IC's. In other words, the LCD according to this embodiment of the present invention applies the control signals CS1 and CS2 alternated for each ½ frame to the first and second control lines CL1 and CL2 to alternately turn on the first thin film transistors TFT1 or the third thin film transistors TFT3, thereby alternately driving the first and second liquid crystal cells 10 and 12 for each ½ frame.

In this case, a gate signal is sequentially applied to the gate lines during one frame interval in the prior art, whereas a gate signal is sequentially applied to the gate lines during each ½ frame interval shorter than the prior art in the embodiment of the present invention.

Accordingly, in order to charge a data signal from the data line into the liquid crystal cell at a shorter time than the prior art, on-currents of the first and third thin film transistors TFT1 and TFT3 connected to the data line DL and the control line CP must be set to have a larger value than those of the second and fourth thin film transistors TFT2 and TFT4. In order to largely set on-currents of the first and third thin film transistors TFT1 and TFT3, channel widths/lengths of the first and third thin film transistors TFT1 and TFT3 must be larger than those of the second and fourth thin film transistors TFT2 and TFT4. For example, if a size of the liquid crystal display panel is 15 inches, then channel widths of the first and third thin film transistors TFT1 and TFT3 are more than about 60 µm.

As the channel widths of the first and third thin film transistors TFT1 and TFT3 are enlarged, a capacitance value of a parasitic capacitor between the gate electrodes and the source electrodes of the first and third thin film transistors TFT1 and TFT3 is increased. Thus, a feed-through voltage also is increased in proportion to such an increase of the capacitance value. In order to reduce this, Any source electrode 108 of the first and third thin film transistors TFT1 and TFT3 takes a "W" shape in such a manner to have at least two apertures. Any source electrode 108 of the first and third thin film transistors TFT1 and TFT3 includes a first source pattern 108a protruded from the data line DL in a direction perpendicular to the data line DL, and second to fourth source patterns 108b, 108c and 108d protruded from the first source pattern 108a in a direction perpendicular to the first source pattern 108 and spaced at a desired distance from the first source pattern 108a to define first and second apertures 170a and 170b.

Any drain electrode 110 of the first and third thin film transistors TFT1 and TFT3 takes a "U" shape in such a manner to have at least one aperture. To this end, Any drain electrode 110 of the first and third thin film transistors TFT1 and TFT3 includes a first drain pattern 110a, and second and third drain patterns 110b and 110c protruded in a vertical direction and spaced at a desired distance from the first drain pattern 110a to define a third aperture ratio 170c. Herein, the second drain pattern 110b is spaced at a desired distance from the source electrode 108 at the first aperture 170a; the third drain pattern 110c is spaced at a desired distance from the source electrode 108 at the second aperture 170b; and the third source pattern 108c is spaced at a desired distance from the drain electrode 110 at the third aperture 170c.

The semiconductor pattern provided between the source and drain electrodes 108 and 110 of the first and third thin film transistors TFT1 and TFT3 and the gate insulating film 112 includes an active layer 114, and an ohmic contact layer 116 provided along the source and drain electrodes 108 and 110 on the active layer 114 in such a manner to have a "W"-shaped hole.

Any source electrode 104 of the second and fourth thin film transistors TFT2 and TFT4 takes a "U" shape in such a manner to have at least one aperture. Any source electrode 104 of the second and fourth thin film transistors TFT2 and TFT4 includes a first source pattern 104a connected to the drain electrodes of the first and third thin film transistors TFT1 and TFT3, and second and third source pattern 104b and 104c protruded and spaced at a desired distance from the first source pattern 104a to provide an aperture 180.

Any drain electrode 102 of the second and fourth thin film transistors TFT2 and TFT4 includes a first drain pattern 102a inserted into the aperture and opposed to the source electrode, and a second drain pattern 102b having a larger width than the first drain pattern 102a and connected to the pixel electrode.

The semiconductor pattern provided between the source and drain electrodes 104 and 102 of the second and fourth thin film transistors TFT2 and TFT4 and the gate insulating film 112 includes an active layer 114, and an ohmic contact layer 116 provided along the source and drain electrodes 108 and 110 on the active layer 114 to have a "U" shape hole.

As mentioned above, the first and third thin film transistors TFT1 and TFT3 connected to the first and second control lines CL1 and CL2 has a larger channel length than the second and fourth thin film transistors TFT2 and TFT4 connected to the gate line GL as illustrated in FIG. 6A and FIG. 6B.

The first pixel electrode 122 is connected, via a contact hole 120, to the drain electrode 102 of the second thin film transistor TFT2 to be provided at the first pixel area 105. Particularly, the first pixel electrode 122 includes a first horizontal part 122a overlapping with the second control line CL2, a second horizontal part 122b overlapping with the first control line CL1, a third horizontal part 122c overlapping with the common line 130, and a finger part 122d provided between the first and third horizontal parts 122a and 122c and the second and third horizontal parts 122b and 122c.

The second pixel electrode 124 is connected, via a contact hole, to the drain electrode of the fourth thin film transistor TFT4 to be provided at the second pixel area 107. Particularly, the second pixel electrode 124 includes a first horizontal part 124a overlapping with the first control line CL1, a second horizontal part 124b overlapping with the second control line CL2, a third horizontal line CL2, a third horizontal part 124c overlapping with the common line 130, and a finger part 124b provided between the first and third horizontal parts 124a and 124c and the second and third horizontal parts 124b and 124c.

The first common electrode 134 is connected to the common line 130 to be provided at the first pixel area 105. Particularly, the first common electrode 134 is provided in parallel to the first pixel electrode 122 at the first pixel area 105. The first common electrode 134 being adjacent to the ith data line DLi of the first common electrode 134 has a larger width than other first common electrodes 134. This aims at preventing a variation of pixel voltage caused by a parasitic capacitor Cdp between the ith data line DLi and the pixel electrode 122.

The second common electrode 136 is connected to the common line 130 to be provided at the second pixel area 107. Particularly, the second common electrode 136 is provided in parallel to the second pixel electrode 124 at the second pixel area 107. The second common electrode 136 being adjacent to the (i+1)th data line DLi+1 of the second common electrode 136 has a larger width than other second common electrodes 136. This aims at preventing a variation of pixel voltage caused by a parasitic capacitor Cdp between the (i+1)th data line DLi+1 and the pixel electrode 122.

Accordingly, a horizontal electric field is formed between the pixel electrodes 122 and 124 to which a pixel signal is applied and the common electrodes 134 and 136 to which a reference voltage is applied via the common line 130. This horizontal electric field rotates liquid crystal molecules arranged in a horizontal direction between the thin film transistor array substrate and the color filter array substrate owing to a dielectric anisotropy. Transmittance of a light transmitting a pixel area is differentiated depending upon a ration extent of the liquid crystal molecules, thereby implementing a picture.

The storage capacitor allows a pixel signal charged in the pixel electrodes 122 and 124 to be stably kept until the next pixel signal is charged. To this end, the storage capacitor includes first to third storage capacitors Cst1 to Cst3.

Figure 7:
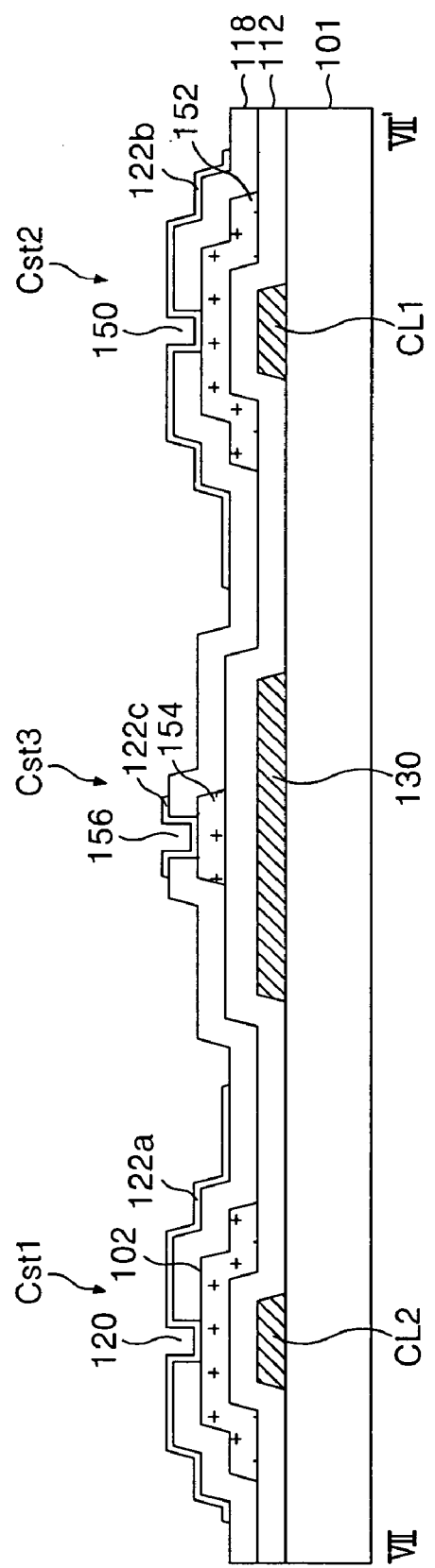
FIG. 7 is a section view of the thin film transistor array substrate taken along the VII–VII' line in FIG. 6.

As illustrated in FIG. 7, the first storage capacitor Cst1 consists of the second control line CL2, and the drain electrode 102 of the second thin film transistor TFT2 overlapping with the second control line CL2 with having the gate insulating film 112 therebetween and being in contact with the first horizontal part 122a via the first contact hole 120.

The second storage capacitor Cst2 consists of the first control line CL1, and a first storage electrode 152 overlapping with the first control line CL1 with having the gate insulating film 112 therebetween and being in contact with the second horizontal part 122b of the pixel electrode via the second contact hole 150.

The third storage capacitor Cst3 consists of the common line 130, and a second storage electrode 154 overlapping with the common line 130 with having the gate insulating film 112 therebetween and being in contact with the third horizontal part 122c of the pixel electrode.

The first storage capacitor Cst1 has the same capacitance value as the second storage capacitor Cst2. Thus, it becomes possible to cancel a coupling according to a variation of the first and second control signals CS1 and CS2 generated when any one of the first and second storage capacitors Cst1 and Cst2 is provided. Furthermore, the first and second storage capacitors Cst1 and Cst2 are formed with the aid of the first and second control lines CL1 and CL2, so that it becomes possible to minimize an aperture ratio reduction caused by the first and second control lines CL1 and CL2.

FIG. 8A to FIG. 12B are plan views and section views illustrating a method of fabricating the thin film transistor array substrate according to this embodiment of the present invention.

Figure 8A:
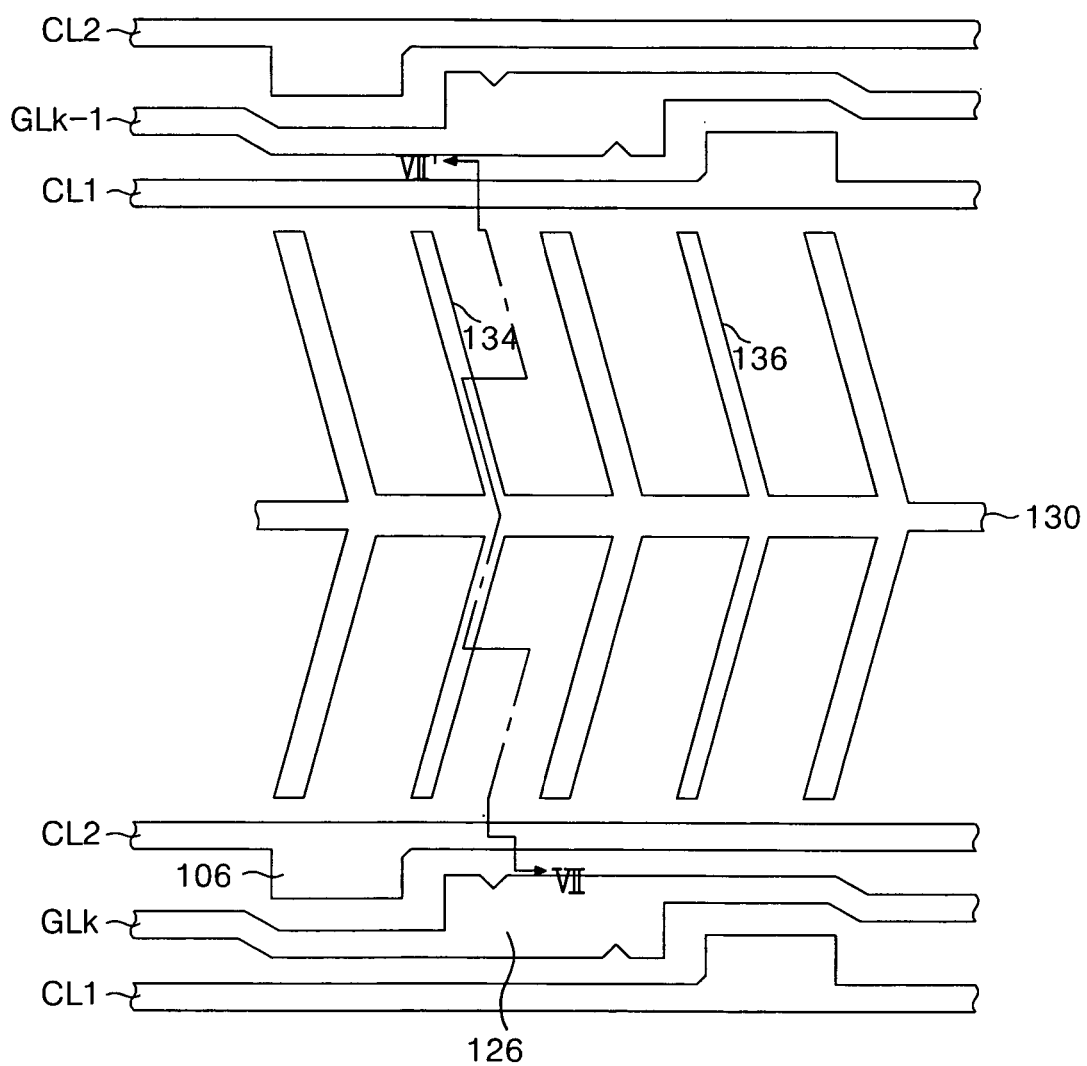

Referring to FIG. 8A and FIG. 8B, a first conductive pattern group including the gate electrodes 106 and 126, the gate lines GLk-1 and GLk, the common line 130, the first and second common electrodes 134 and 136 and the first and second control lines CL1 and CL2 is formed on a lower substrate 101.

More specifically, a gate metal layer is formed on the lower substrate 101 by a deposition technique such as the sputtering, etc. Herein, the gate metal layer is formed from an aluminum (Al) group metal, copper (Cu), chrome (Cr) or molybdenum (Mo), etc. The gate metal layer is patterned by the photolithography and the etching process to thereby provide the first conductive pattern group including the gate electrodes 106 and 126, the gate lines GLk-1 and GLk, the common line 130, the first and second common electrodes 134 and 136 and the first and second control lines CL1 and CL2.

Figure 9A:
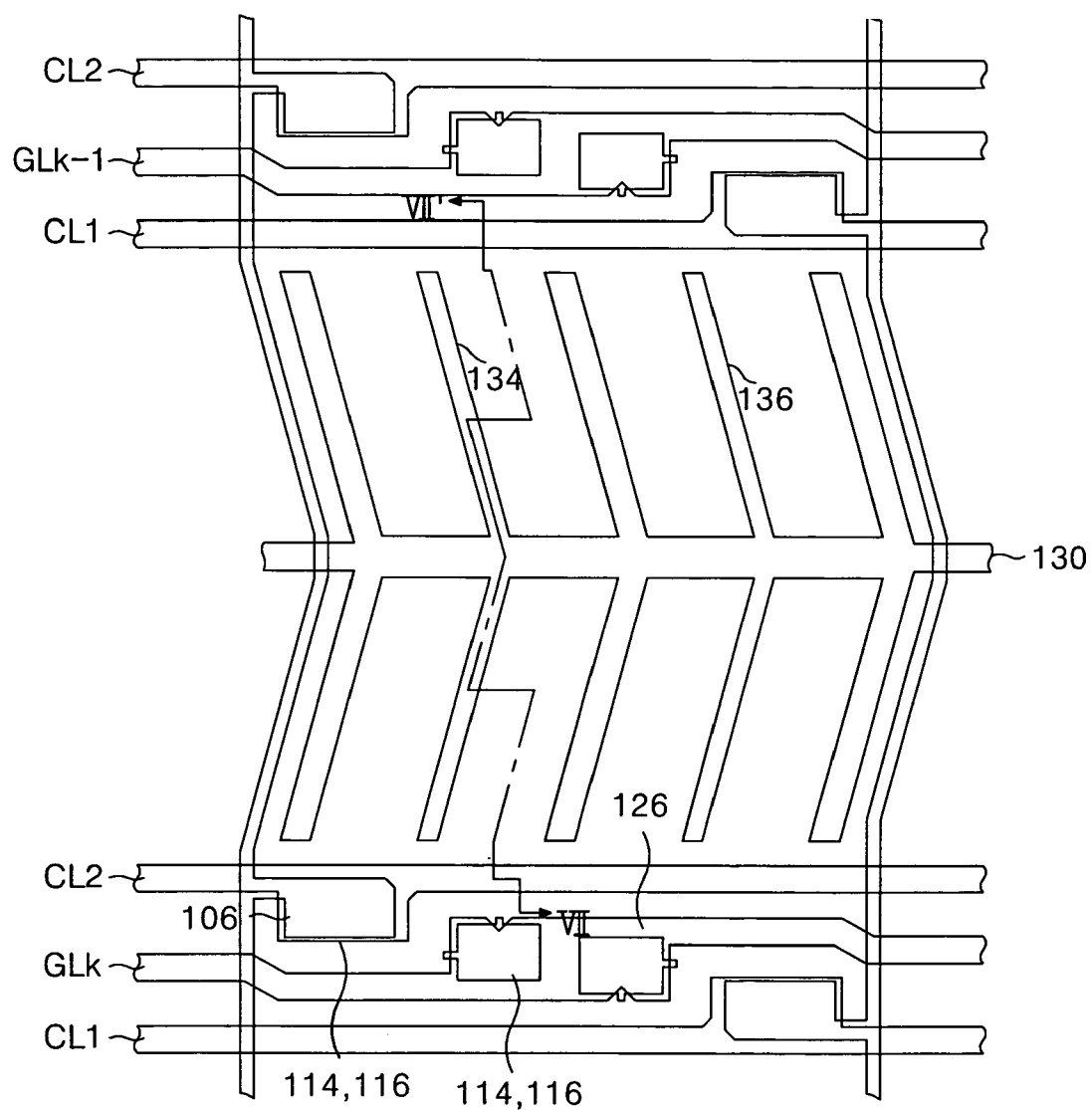
FIG. 9A and FIG. 9B are a plan view and a section view, respectively, representing a fabricating method for providing the semiconductor pattern illustrated in FIG. 5 to FIG. 7, respectively.
Figure 9B:
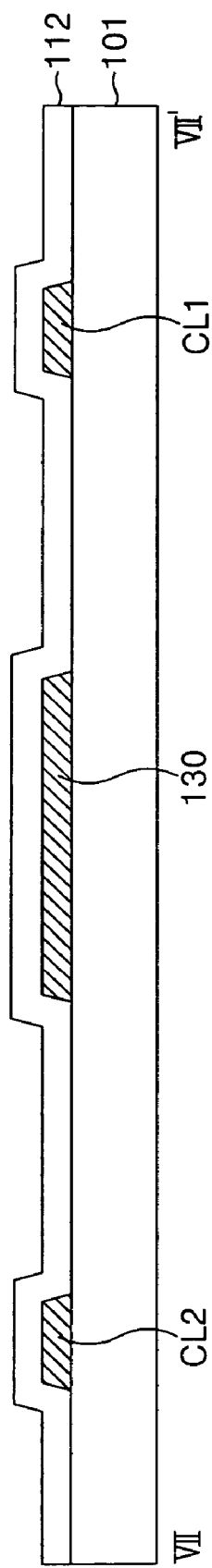
Figure 9B:
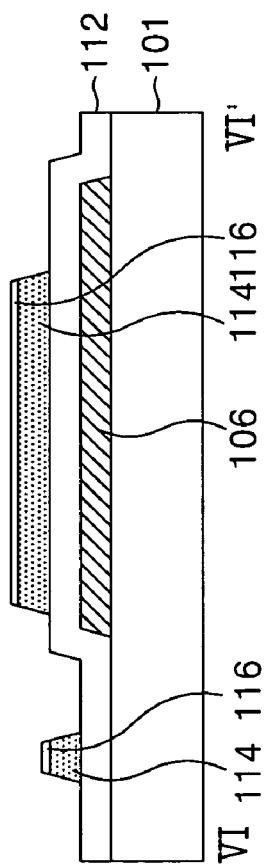

Referring to FIG. 9A and FIG. 9B, the gate insulating film 112 is formed on the lower substrate 101 provided with the first conductive pattern group. Further, the semiconductor pattern including the active layer 114 and the ohmic contact layer 116 is formed on the gate insulating film 112.

More specifically, the gate insulating film 112 and the first and second semiconductor layers are sequentially formed on the lower substrate 101 provided with the first conductive pattern group by a deposition technique such as the plasma enhanced chemical vapor deposition (PECVD) or the sputtering, etc. Herein, the gate insulating film 112 is formed from an inorganic insulating material such as silicon nitride ($SiN_x$) or silicon oxide ($SiO_x$), or an organic insulating material such as BCB (benzocyclobutene), acrylic resin or PFCB (perfluorocyclobutane), etc. The first semiconductor layer is made from an amorphous silicon being not doped with an impurity, whereas the second semiconductor layer is made from an amorphous silicon being doped with a N-type or P-type impurity. Then, the first and second semiconductor layers are patterned by the photolithography and the etching process to thereby provide the semiconductor pattern including the active layer 114 and the ohmic contact layer 116.

Figure 10A:
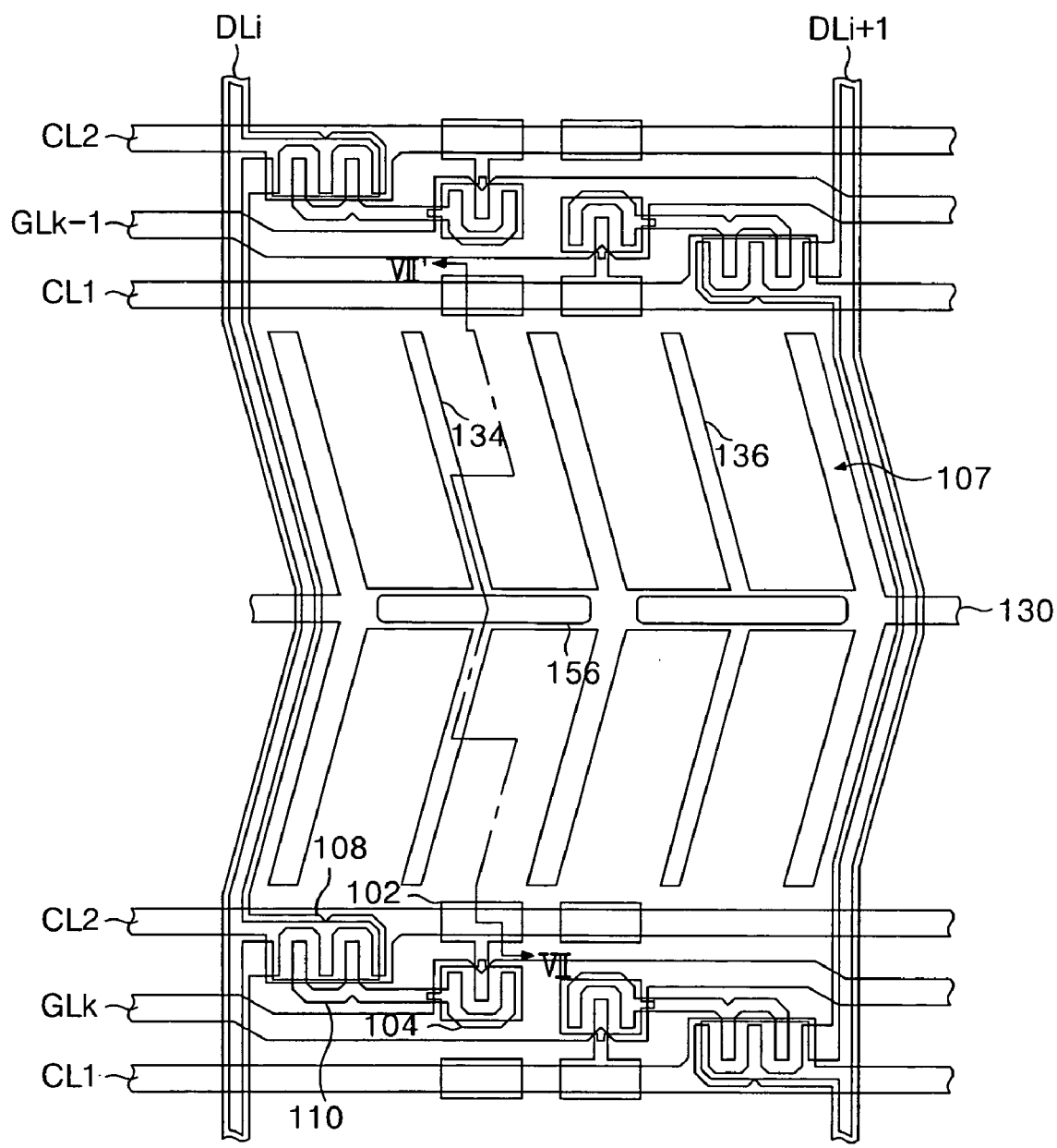

Referring to FIG. 10A and FIG. 10B, a second conductive pattern group including the source electrodes 108 and 104 of the first to fourth thin film transistors TFT1 to TFT4, the drain electrodes 110 and 106 of the first to fourth thin film transistors TFT1 to TFT4 and the data lines DLi and DLi+1 is formed on the gate insulating film 112 provided with the semiconductor pattern.

To this end, a data metal layer is sequentially formed on the gate insulating film 112 provided with the semiconductor pattern by a deposition technique such as the sputtering, etc. Herein, the data metal layer is formed from copper (Cu), molybdenum (Mo), titanium (Ti), tantalum (Ta) or molybdenum alloy, etc. The data metal layer is patterned by the photolithography and the etching process to thereby provide a second conductive pattern group including the source electrodes 108 and 104 of the first to fourth thin film transistors TFT1 to TFT4, the drain electrodes 110 and 106 of the first to fourth thin film transistors TFT1 to TFT4 and the data lines DLi and DLi+1.

Then, the ohmic contact layer 116 of the channel portion exposed by the source and drain electrodes 108, 104, 110 and 106 is dry etched by utilizing the first to fourth source electrodes 108 and 104 and the first to fourth drain electrodes 110 and 106, thereby exposing the active layer 114 of the channel portion. In this case, the active layer 114 of the channel portion of the first and third thin film transistors TFT1 and TFT3 is exposed in a "W" shape while the active layer 114 of the channel portion of the second and fourth thin film transistors TFT2 and TFT4 is exposed in a "U" shape.

Figure 11A:
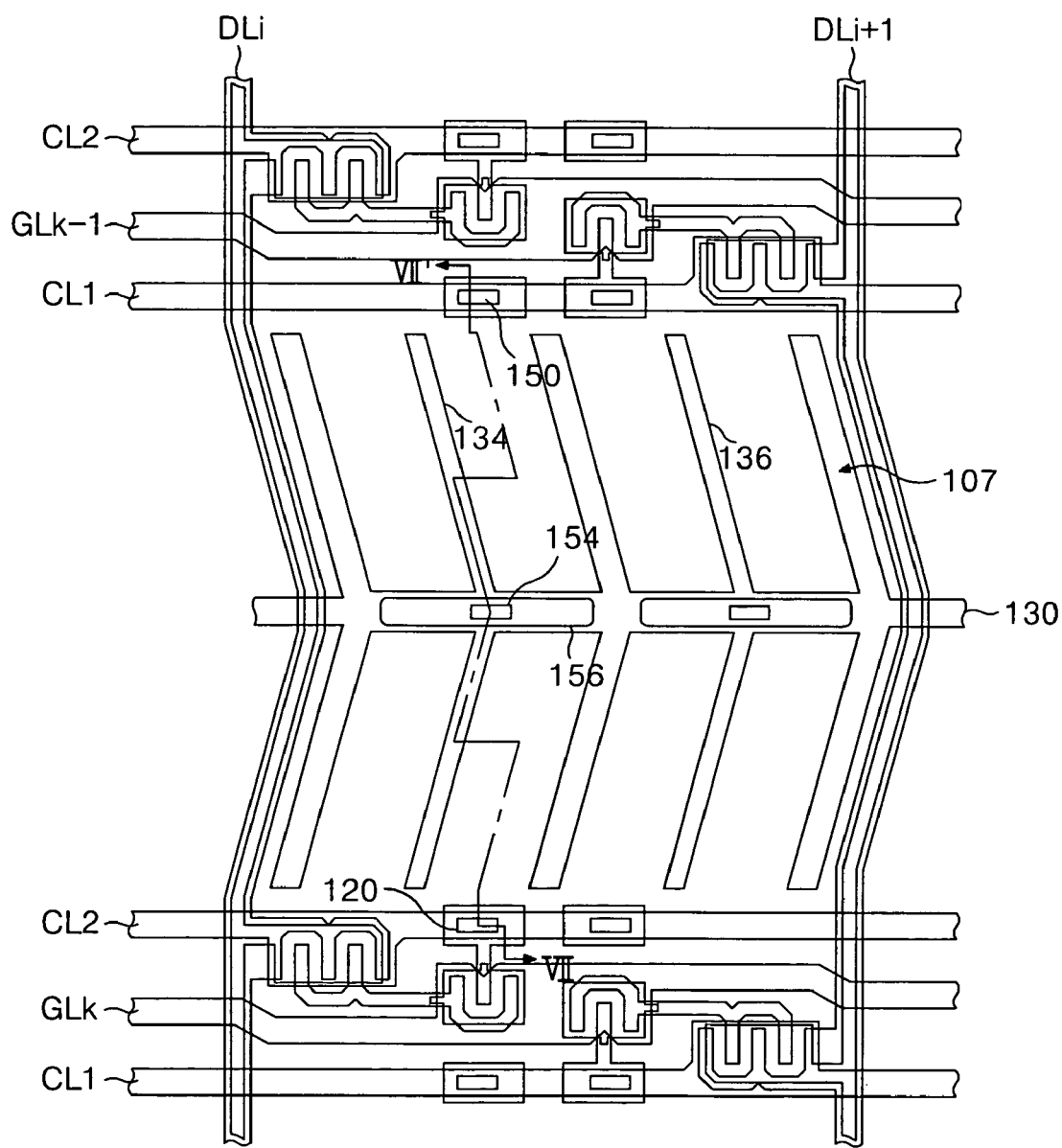

Referring to FIG. 11A and FIG. 11B, the protective film 118 including the contact hole 120 is formed on the gate insulating film 112 provided with the second conductive pattern group.

To this end, the protective film 118 is entirely formed on the gate insulating film 112 provided with the second conductive pattern group by a deposition technique such as the PECVD, etc. Herein, the protective film 118 is formed from an inorganic insulating material identical to the gate insulating film 112, or an organic insulating material such as an acrylic organic compound having a small dielectric constant, BCB or PFCB, etc.

The protective film 118 is patterned by the photolithography and the etching process to thereby provide the contact hole 120. The contact hole 120 passes through the protective film 118 to expose the drain electrodes 110 of the second and fourth thin film transistors TFT2 and TFT4.

Figure 12A:
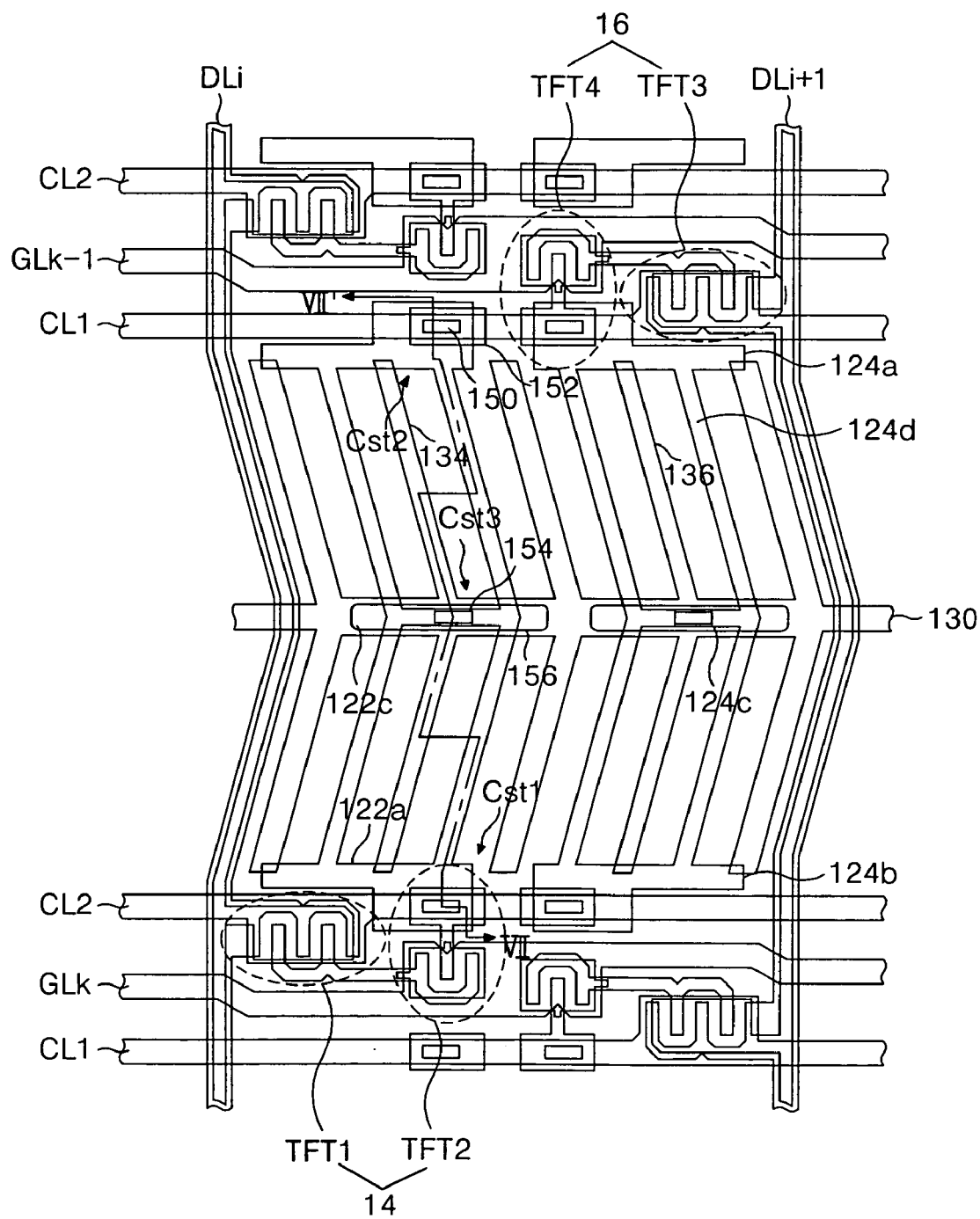
FIG. 12A and FIG. 12B are a plan view and a section view, respectively, representing a fabricating method for providing the third conductive pattern group illustrated in FIG. 5 to FIG. 7, respectively.
Figure 12B:
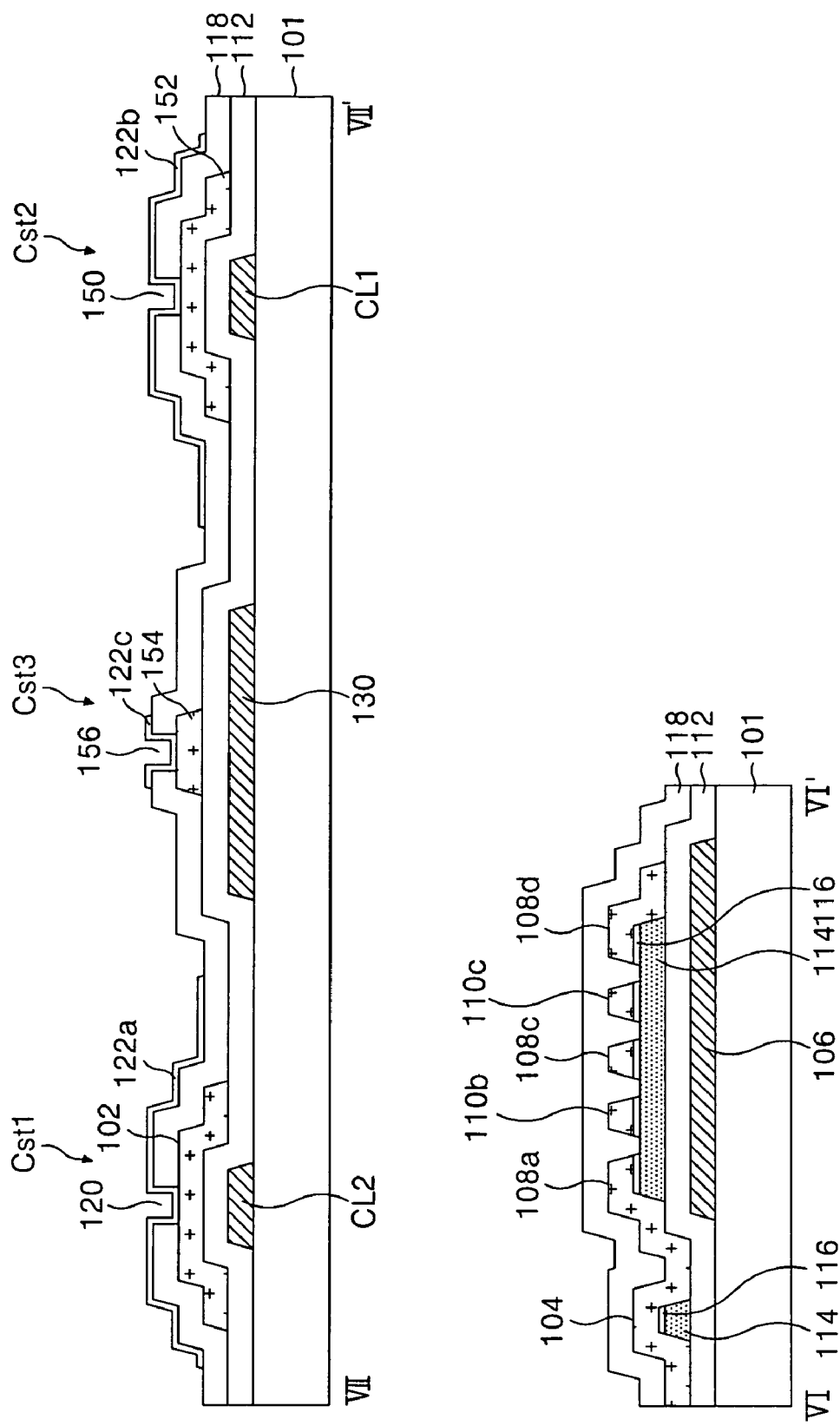

Referring to FIG. 12A and FIG. 12B, a third conductive pattern group including the first and second pixel electrodes 122 and 124 is formed on the protective film 118.

To this end, a transparent conductive film is coated onto the protective film 118 by a deposition technique such as the sputtering, etc. Herein, the transparent conductive film is formed from indium-tin-oxide (ITO), tin-oxide (TO), indium-zinc-oxide (IZO) or indium-tin-zinc-oxide (ITZO), etc. The transparent conductive film is patterned by the photolithography and the etching process to thereby provide the third conductive pattern group including the first and second pixel electrodes 122 and 124. The pixel electrode 122 is electrically connected, via the contact hole 120, to the drain electrode 106 of the second thin film transistor TFT2, whereas the second pixel electrode 124 is electrically connected, via the contact hole, to the drain electrode of the fourth thin film transistor TFT4.

Figure 13:
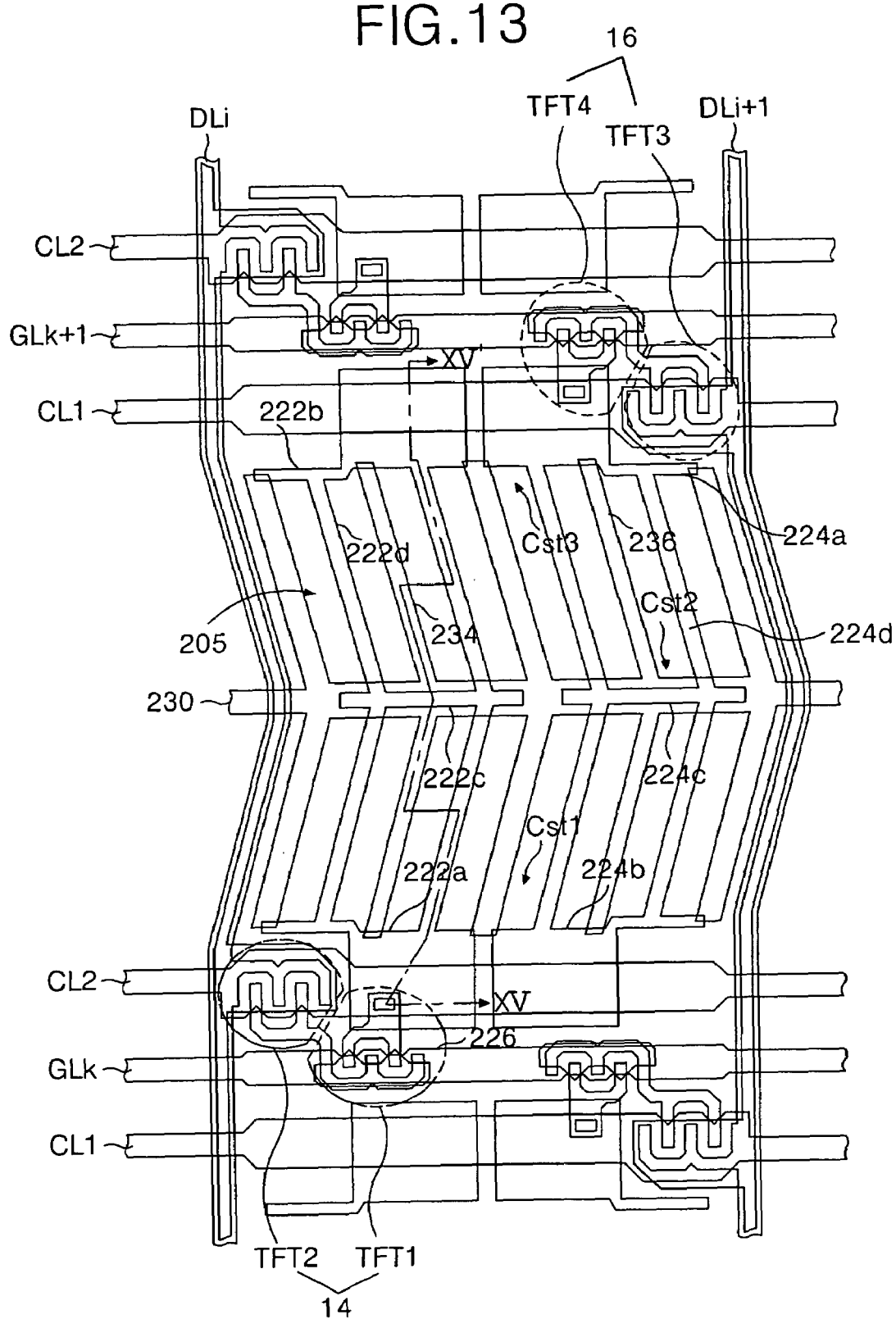
FIG. 13 is a plan view of other example of the thin film transistor array substrate of the liquid crystal display panel illustrated in FIG. 2.

FIG. 13 is a plan view illustrating the thin film transistor array substrate of the liquid crystal display panel according to another embodiment of the present invention.

The thin film transistor array substrate illustrated in FIG. 13 has the same elements as the thin film transistor array substrate illustrated in FIG. 5 except that channel widths of the second and fourth thin film transistor illustrated in FIG. 13 is larger than those of the second and fourth thin film transistor illustrated in FIG. 5. Therefore, a detailed explanation as to the same elements will be omitted.

The second and fourth thin film transistors TFT2 and TFT4 illustrated in FIG. 13 are formed in such a manner to have the same turn-on current as the first and third thin film transistors TFT1 and TFT3. As the size of the liquid crystal display panel is increased, the sizes of the second and fourth thin film transistors TFT2 and TFT4 are also enlarged. Thus, the capacitance of the parasitic capacitor is also increased in proportion to such an enlargement of the size, thereby increasing a feed-through voltage.

Figure 14:
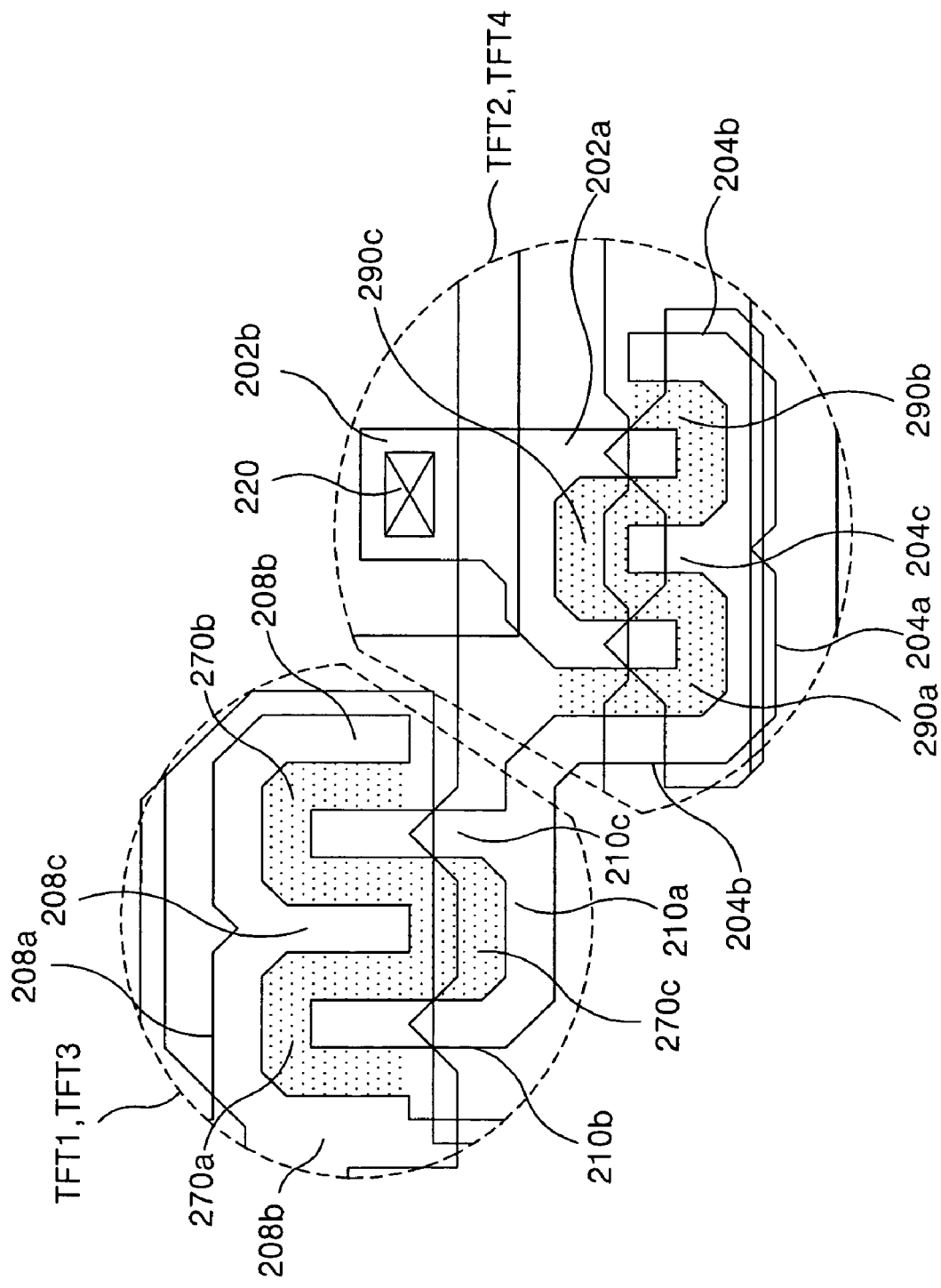
FIG. 14 is a detailed plan view of the thin film transistor illustrated in FIG. 13.

Accordingly, the second and fourth thin film transistors TFT2 and TFT4 are formed in a "W" shape such that at least any one source electrode 204 of them has at least two apertures similar to the first and third thin film transistors TFT1 and TFT3. As illustrated in FIG. 14, any source electrode 204 of the second and fourth thin film transistors TFT2 and TFT4 includes a first source pattern 204a protruded in a vertical direction from the drain electrodes of the first and third thin film transistors TFT1 and TFT3, and second to fourth source pattern 204b, 204c and 204d protruded in a vertical direction and spaced at a desired distance from the first source pattern 204a to provide first and second apertures 290a and 290b.

Any drain electrode 202 of the second and fourth thin film transistors TFT2 and TFT4 is formed in a "U" shape in such a manner to have at least one aperture. To achieve this, any drain electrode 202 of the second and fourth thin film transistors TFT2 and TFT4 includes a first drain pattern 202a opposed to the source electrode with having a channel therebetween, and a second drain pattern 202b connected to the first drain pattern 202a and the pixel electrode. The first drain pattern 202a is provided in such a manner to be opposed to the source electrode 204 with having the first to third apertures 290a to 290c therebetween. The semiconductor pattern provided between the source and drain electrodes 204 and 202 of the second and fourth thin film transistors TFT2 and TFT4 and the gate insulating film 212 includes an active layer 214, and an ohmic contact layer 216 provided along the source and drain electrodes 208 and 210 on the active layer 214 to have a "W" shape hole.

As mentioned above, the first and third thin film transistors TFT1 and TFT3 connected to the first and second control lines CL1 and CL2 has a larger channel width than the second and fourth thin film transistors TFT2 and TFT4 connected to the gate line GL as illustrated in FIG. 14.

The storage capacitor allows a pixel signal charged in the pixel electrodes 222 and 224 to be stably kept until the next pixel signal is charged. To this end, the storage capacitor includes first to third storage capacitors Cst1 to Cst3.

Figure 15:
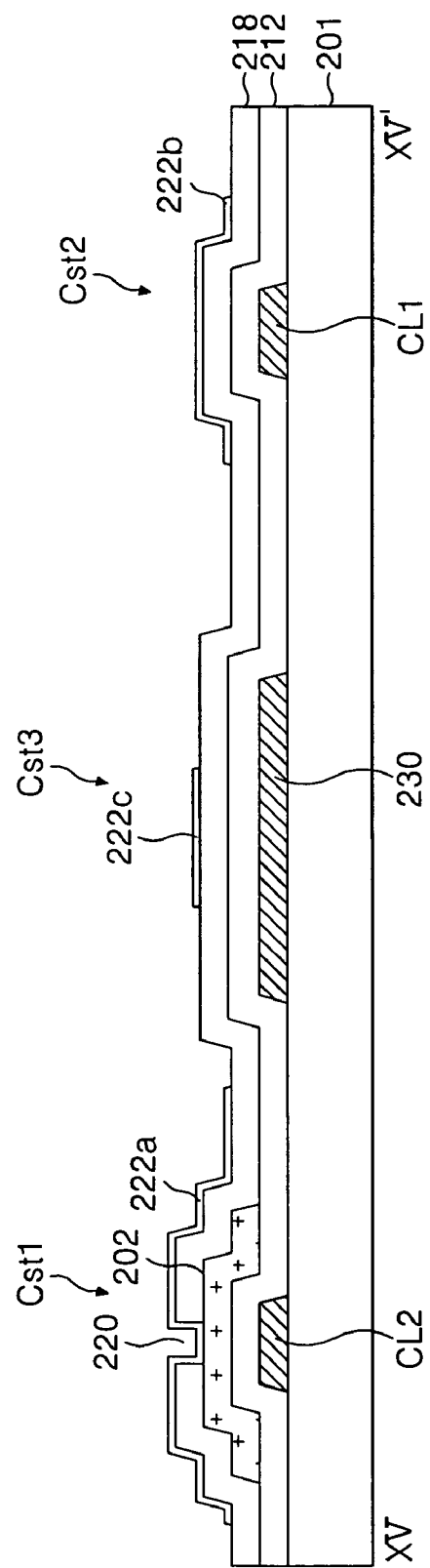
FIG. 15 is a section view of the thin film transistor array substrate taken along the XV–XV' line in FIG. 13.

As illustrated in FIG. 15, the first storage capacitor Cst1 consists of the second control line CL2, and the drain electrode 202 of the second thin film transistor TFT2 overlapping with the second control line CL2 with having the gate insulating film 212 therebetween and being in contact with the first horizontal part 222a via the first contact hole 220.

The second storage capacitor Cst2 consists of the first control line CL1, and a second horizontal part 222b of the pixel electrode overlapping with the first control line CL1 with having the gate insulating film 212 and the protective film 218 therebetween.

The third storage capacitor Cst3 consists of the common line 230, and a third horizontal part 222c of the pixel electrode overlapping with the common line 230 with having the gate insulating film 212 and the protective film 218 therebetween.

The first storage capacitor Cst1 has the same capacitance value as the second storage capacitor Cst2. Thus, it becomes possible to cancel a coupling according to a variation of the first and second control signals CS1 and CS2 generated when any one of the first and second storage capacitors Cst1 and Cst2 is provided. Furthermore, the first and second storage capacitors Cst1 and Cst2 are formed with the aid of the first and second control lines CL1 and CL2, so that it becomes possible to minimize an aperture ratio reduction caused by the first and second control lines CL1 and CL2.

In addition, the method of fabricating the thin film transistor array substrate according to the first and second embodiments of the present invention can use a partial exposure mask including a half tone mask or a diffractive mask, thereby reducing the number of mask processes. For instance, the semiconductor pattern and the second conductive pattern group can be formed simultaneously by utilizing the partial exposure mask.

As described above, according to the present invention, channel widths of the first and third thin film transistors are set to have a larger value than those of the second and fourth thin film transistors. In this case, the first and third channels are defined in a "W" shape to thereby reduce an overlap area between the gate electrode and the source electrode in comparison with a stripe-shaped channel. Accordingly, a capacitance value of the parasitic capacitor between the gate electrode and the source electrode is reduced and hence a feed-through voltage is reduced, so that it becomes possible to prevent a deterioration of picture quality including a vertical cross talk.

Furthermore, according to the present invention, the liquid crystal cells positioned at the odd-numbered vertical lines and the liquid crystal cells positioned at the even-numbered vertical lines are alternately driven for each ½ frame unit. In this case, a single of data line drives the liquid crystal cells being adjacent to each other at the left and right sides, so that the number of data lines can be reduced to about a half. Accordingly, the number of data drivers supplying a driving signal to the data line also can be reduced to a half, thereby reducing the manufacturing cost.

Although the present invention has been explained by the embodiments illustrated in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display panel, comprising:
   a plurality of gate lines provided on a substrate;
   a first and a second control lines provided in a direction parallel to the gate lines;
   a first and a second data lines crossing the gate lines to define a first and a second pixel areas;
   a first and a second pixel electrodes provided at the respective first and second pixel area;
   a first switching part having at least two thin film transistors for applying a first pixel signal supplied to the first data line to the first pixel electrode under control of the second control line and the gate line; and
   a second switching part having at least two thin film transistors for applying a second pixel signal supplied to the second data line to the second pixel electrode under control of the first control line and the gate line,
   wherein a turn-on current value of any one of said at least two thin film transistors, in each of the first and second switching parts, is more than that of the other thin film transistor.

2. The liquid crystal display panel according to claim 1, wherein the first switching part includes:
   a first thin film transistor, being turned on when a control signal is applied to the second control line, for receiving said first pixel signal; and
   a second thin film transistor, being connected to the gate line to be turned on when said gate signal is supplied, for applying said first pixel signal to the first pixel electrode,
   wherein the first thin film transistor has a larger channel width than the second thin film transistor.

3. The liquid crystal display panel according to claim 2, wherein the first thin film transistor includes a gate electrode connected to the second control line, a source electrode connected to the first data line and having at least three protrusions, a drain electrode having at least two protrusions connected to the source electrode of the second thin film transistor, and a first width of channel provided between the source and drain electrodes; and
   the second thin film transistor includes a gate electrode connected to the gate line, a source electrode connected to the drain electrode of the first thin film transistor and having at least two protrusions, a drain electrode connected to the first pixel electrode and having at least one protrusion, and a semiconductor pattern having a second width of channel less than said first width provided between the source and drain electrodes.

4. The liquid crystal display panel according to claim 1, wherein the second switching part includes:
   a third thin film transistor, being turned on when a control signal is applied to the first control line, for receiving said second pixel signal; and
   a fourth thin film transistor, being connected to the gate line to be turned on when said gate signal is supplied, for applying said second pixel signal to the second pixel electrode,
   wherein the third thin film transistor has a larger channel width than the fourth thin film transistor.

5. The liquid crystal display panel according to claim 4, wherein the third thin film transistor includes a gate electrode connected to the first control line, a source electrode connected to the second data line and having at least three protrusions, a drain electrode having at least two protrusions connected to the source electrode of the fourth thin film transistor, and a first width of channel provided between the source and drain electrodes; and
   the fourth thin film transistor includes a gate electrode connected to the gate line, a source electrode connected to the drain electrode of the third thin film transistor and having at least two protrusions, a drain electrode connected to the second pixel electrode and having at least one protrusion, and a semiconductor pattern having a second width of channel less than said first width provided between the source and drain electrodes.

6. The liquid crystal display panel according to claim 3, wherein a semiconductor pattern of the first and third thin film transistors includes an active layer and an ohmic contact layer having a "W"-shaped hole along the source drain electrodes on the active layer, and
   wherein a semiconductor pattern of the second and fourth thin film transistors includes an active layer, and an ohmic contact layer having a hole taking any one of "U" and "W" shapes.

7. The liquid crystal display panel according to claim 5, wherein a semiconductor pattern of the first and third thin film transistors includes an active layer and an ohmic contact layer having a "W"-shaped hole along the source drain electrodes on the active layer, and
   wherein a semiconductor pattern of the second and fourth thin film transistors includes an active layer, and an ohmic contact layer having a hole taking any one of "U" and "W" shapes.

8. The liquid crystal display panel according to claim 1, further comprising:
   a first common electrode making a horizontal electric field along with the first pixel electrode;
   a second common electrode making a horizontal electric field along with the second pixel electrode; and
   a common line provided in parallel to the gate line to apply a reference voltage to the first and second common electrodes.

9. The liquid crystal display panel according to claim 8, further comprising:
   a first storage capacitor consisting of the first control line, and any one of the first and second pixel electrodes overlapping with the first control line with having at least one layer of insulating film therebetween;
   a second storage capacitor consisting of the second control line, and any one of the first and second pixel electrodes overlapping with the second control line with having at least one layer of insulating film therebetween; and a third storage capacitor consisting of the common line, and any one of the first and second pixel electrodes overlapping with the common line with having at least one layer of insulating film therebetween.

10. The liquid crystal display panel according to claim 8, further comprising:

a first storage capacitor consisting of the first control line, and a first storage electrode connected to any one of the first and second pixel electrodes overlapping with the first control line with having at least one layer of insulating film therebetween;

a second storage capacitor consisting of the second control line, and the drain electrode of the second thin film transistor connected to any one of the first and second pixel electrodes overlapping with the second control line with having at least one layer of insulating film therebetween, said second storage capacitor having the same capacitance value as the first storage capacitor; and a third storage capacitor consisting of the common line, and a second storage electrode connected to any one of the first and second pixel electrodes overlapping with the common line with having at least one layer of insulating film therebetween.

* * * * *